United States Patent
Narita et al.

(10) Patent No.: US 6,967,586 B2
(45) Date of Patent: Nov. 22, 2005

(54) BEARING TEST METHOD, BEARING TEST DEVICE, BEARING MONITORING DEVICE AND STORAGE DEVICE

(75) Inventors: Takayuki Narita, Nagano (JP); Haruhiro Tsuneta, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 489 days.

(21) Appl. No.: 09/981,665

(22) Filed: Oct. 16, 2001

(65) Prior Publication Data

US 2002/0083779 A1 Jul. 4, 2002

(30) Foreign Application Priority Data

Oct. 20, 2000 (JP) .......................... 2000-320311
Oct. 20, 2000 (JP) .......................... 2000-321458

(51) Int. Cl.[7] .............................................. G08B 21/00
(52) U.S. Cl. ................ 340/682; 340/686.2; 340/686.3; 340/686.4; 340/686.5; 324/691; 73/862.49
(58) Field of Search ................. 340/682, 679, 340/680, 686.4, 686.5, 686.6, 686.2, 686.3, 668; 324/691; 73/862.49

(56) References Cited

U.S. PATENT DOCUMENTS 5,072,611 A * 12/1991 Budd et al. ................ 73/118.1
6,140,931 A * 10/2000 Yamane et al. .......... 340/686.6

* cited by examiner

Primary Examiner—Julie Bichngoc Lieu
(74) Attorney, Agent, or Firm—Hogan & Hartson LLP

(57) ABSTRACT

A bearing test method and a bearing test device are provided for bearings in which a non-contact state is maintained between a shaft element and a bearing element in a normal rotation state. In addition, a motor bearing monitoring device is provided to detect an abnormality in a motor or that a motor's life is near its end, where the motor utilizes the bearing. Furthermore, a storage device such as a hard disk drive equipped with the motor monitoring device is provided. For a bearing that can retain a shaft element and a bearing element coaxially positioned in a non-contact state when the number of revolutions exceeds a predetermined number of relative revolutions, a bearing test method is provided to determine whether the shaft element and the bearing element are in a contact rotation state. The bearing test method includes at least the steps of rotating the shaft element and the bearing element relatively with one another and detecting impedance between the shaft element and the bearing element in the relative rotation state. A determination is made based on a change in impedance as to whether the shaft element and the bearing element are in a contact rotation state.

56 Claims, 23 Drawing Sheets

(In contact state)

(In floating rotation)

(In contact state)

(In floating rotation)

(In contact state)

(In floating rotation)

FIG. 15  Detection based on impedance changes (In contact state)

(In floating rotation)

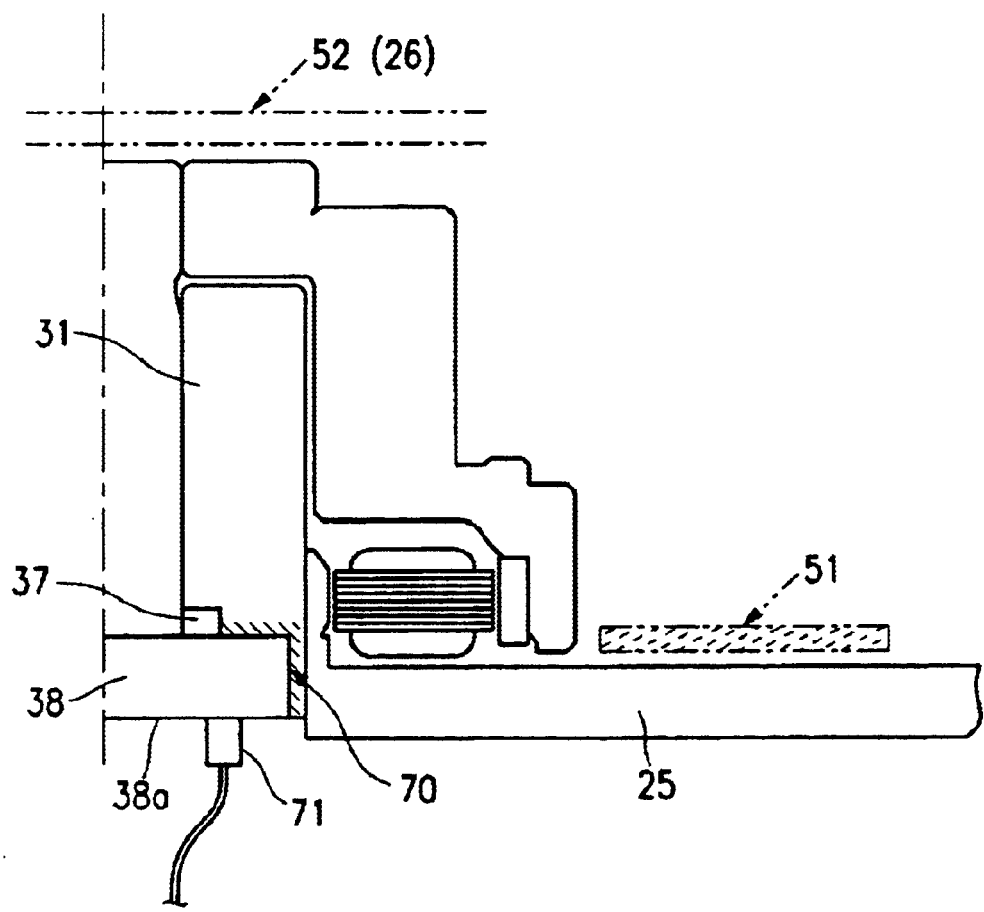

Detection of contact noise by AE sensor
AE sensor (acoustic emission) is mounted on motor or on periphery of motor

BEARING TEST METHOD, BEARING TEST DEVICE, BEARING MONITORING DEVICE AND STORAGE DEVICE

BACKGROUND OF THE INVENTION

1. Field of the Invention

The present invention relates to a bearing test method and a bearing test device for bearings in which a non-contact state is maintained between a shaft element and a bearing element in a normal rotation state. In addition, the present invention relates to a motor bearing monitoring device that can detect an abnormality in a motor or that a motor's life is near its end, where the motor utilizes the bearing described above. Furthermore, the present invention relates to a storage device such as a hard disk drive equipped with the motor monitoring device.

2. Description of Related Art

Bearings in which a shaft element and a bearing element retain a non-contact state between them in a normal rotation state have been in use for some time. One such bearing, for example, is a dynamic pressure bearing.

A dynamic pressure bearing has a structure in which grooves for dynamic pressure generation through oil, air or other fluids are formed between the shaft element and the bearing element; when the shaft element and the bearing element rotate relatively, the dynamic pressure increases as the rotation speed increases, and when the rotation speed exceeds a predetermined number of revolutions (number of float revolutions) a fluid film causes the shaft element to float up from the bearing element and shift to a non-contact rotation state. Conversely, when the rotation speed falls below the predetermined number of revolutions (number of contact revolutions), the state switches back to the contact rotation state. Such a dynamic pressure bearing is used as a bearing for a high-speed rotation motor, such as a hard disk drive motor.

A higher number of float revolutions or of contact revolutions translates into a longer contact rotation state when the motor starts or stops. The longer contact rotation state device increased amount of wear on the bearing section during intermittent motor drive, which shortens the life of the bearing. Additionally, due to the fact that lubricating oil's viscosity reduces inversely to the rise in the oil's temperature, the number of float revolutions or contact revolutions increases the higher the temperature; consequently, there is a risk that the amount of wear on the bearing section would worsen significantly. Thus, the number of float revolutions or of contact revolutions must be maintained at a sufficiently low level against the number of rated revolutions. As a result, the number of float revolutions or contact revolutions of a dynamic pressure bearing is considered to be one of the critical testing items of its properties.

In the past, the measurement of the number of contact revolutions of dynamic pressure bearings was generally done using the AE (Acoustic Emission) method. The AE method is a method in which the acoustic energy generated by metals coming into contact with each other is detected by a vibration sensor and converted into voltage.

FIG. 23 shows an example of an AE waveform based on the AE method obtained from a motor equipped with an oil dynamic pressure bearing, along with changes in the number of motor revolutions. The strength of vibration detected by an AE sensor from a motor bearing section is converted into voltage, and the result is observed as an AE waveform on an oscilloscope screen. The number of motor revolutions is a measured value of the number of revolutions provided by a tachometer (voltage value when using a tachometer).

A method that uses the AE method to detect the number of float or contact revolutions of the dynamic pressure bearing or abnormalities in general bearings entails the following problems.

First, in a dynamic pressure bearing such as an oil dynamic pressure bearing, the two metal members (the shaft element and the bearing element) are lubricated with lubricating oil between them, which causes the contact sound made when the two metal members come in contact to be extremely small, and it is difficult to completely eliminate noise from detection signals. Consequently, the number of contact revolutions cannot be detected with high precision.

Additionally with the AE method, a sensor for detecting contact sound must be in direct contact with the bearing section or a motor composition part in which the bearing is assembled; when the sensor contact is imperfect, the detection precision for the contact sound is decreased, and pass/fail judgments on bearings cannot be adequately made.

Furthermore, due to large deviations in detection sensitivity, making pass/fail judgments on bearings based upon detection signal waveform is difficult. For instance, when the bearing switches from a non-contact rotation state to a contact rotation state, metal contact sound is detected and the detection signal level rises, but because there are large deviations in the detection signal level it is difficult to establish a threshold voltage that would be the criterion to determine that the bearing has switched to a contact rotation. As a result, automatic testing cannot be done and there is no choice but to rely on human sensibility. This leads to ambiguous pass/fail judgments.

A memory device, such as a hard disk drive, is made up of a disk driving motor, on which a plurality of hard disks is mounted, and a magnetic head to record on or retrieve from the hard disks; the disk driving motor's rotor is supported in a freely rotatable manner against a stator by a ball bearing or a dynamic pressure bearing.

In such a hard disk drive, if there is an abnormality with the disk driving motor or the disk driving motor reaches the end of its life, operation errors occur in retrieving and recording. In extreme cases, uneven rotation or a motor lock state occurs and recording and retrieving information become impossible.

Operation errors with disk driving motors are frequently caused by abnormalities with the bearing or due to the fact that the bearing is reaching the end of its life. For example, with a ball bearing, worn balls, depletion of lubricant, or contamination by foreign matters such as metal pieces can cause rotation abnormalities in the motor. Also, the following can cause rotation abnormalities in a motor when an oil dynamic pressure bearing is used in the motor: contamination by foreign matter such as metal pieces in the gap between a shaft element and a bearing element that is rotatable in a non-contact manner via a lubrication film; depletion of oil in the gap between the shaft element and the bearing element; or wear on the bearing element. Similarly, when an air dynamic pressure bearing is used, contamination by foreign matter in the gap between the shaft element and the bearing element or wear on the bearing element can cause rotation abnormalities in the motor.

However, conventional memory devices such as hard disk drives are not equipped with any means to predict in advance occurrences of operation errors caused by these abnormalities in the motor bearing. Consequently, the operator first becomes aware of operation errors only when fatal problems such as uneven motor rotation or motor lock occur. But in these situations, there is a high possibility that a critical problem of not being able to read recorded data has already occurred.

In the meantime, a method to monitor the rise in motor drive current is known as a method for detecting abnormalities in the motor. However, an abnormal rise in motor current occurs after a burn caused by metal friction contact of motor elements of the motor bearing, so that by the time a rise in the motor current is detected it is often already too close to a state in which recorded data are unretrievable. Consequently, it is impossible with this method to detect abnormalities in a motor bearing while recorded data are still transferable.

As a result, in conventional memory devices, an adverse effect of losing recorded data when the recorded data become unretrievable due to motor operation error caused by a motor bearing abnormality is considered unavoidable to some extent.

In view of the problems found in conventional bearing test methods, the present invention suggests a bearing test method and a bearing test device that can detect the rotation state of a bearing without using the AE method. In particular, the present invention suggests a bearing test method and a bearing test device suitable for testing dynamic pressure bearings assembled in hard disk drive motors.

Additionally, the present invention suggests a motor bearing monitoring device that can detect abnormalities in bearings of motors mounted on memory devices before an operational shutdown.

Furthermore, the present invention suggests a memory device that is equipped with the motor bearing monitoring device and that can warn beforehand that recorded data would become unretrievable or that can backup the recorded data before the recorded data become unretrievable.

SUMMARY OF THE INVENTION

In order to solve the problems described above, the present invention provides a bearing test method to test, in a bearing that can retain a shaft element and a bearing element coaxially positioned in a non-contact state when the number of revolutions exceeds a predetermined number of relative revolutions, whether the shaft element and the bearing element are in a contact rotation state; by having the shaft element and the bearing element relatively rotate and by detecting impedance between the shaft element and the bearing element in the relative rotation state, the present invention can determine based on changes in impedance whether the shaft element and the bearing element are in a contact rotation state.

In other words, when the shaft element and the bearing element are in a non-contact rotation state, a constant gap, as well as a fluid film, is formed between them. The constant gap and the fluid can be considered a constant resistance and capacitance, respectively. Conversely, when the shaft element and the bearing element are in a contact rotation state, they are in direct contact with each other and there is therefore no substantive resistance or capacitance between them. By taking advantage of these facts and by detecting these electrical changes, the rotation states of the shaft element and the bearing element become detectable.

As a consequence, rotation states can be detected without using the AE method. Also, because changes in impedance, i.e., changes in resistance and capacitance, are detected, switching noises of drive current of a motor assembled in a bearing are not an obstacle as they are in the AE method. Furthermore, due to the fact that sufficient detection signal level can be secured and deviations in detection precision are controllable, it would be possible to detect rotation states with high precision.

Resistance changes or capacitance changes, or both, in the bearing section may be detected in order to detect impedance changes.

Impedance changes are detected while the number of relative revolutions of the shaft element and the bearing element is varied, and based on a detected impedance change, the number of relative revolutions when the shaft element and the bearing element switch from a contact rotation state to a non-contact rotation state, or from a non-contact rotation state to a contact rotation state, is detected.

Next, using the method according to the present invention, it is possible to determine based on impedance changes whether the shaft element and the bearing element are in an abnormal contact rotation state.

In this case, when the number of relative revolutions is constant and when impedance changes occur in an irregular manner, the abnormal contact rotation state can be determined to have been caused by a foreign matter that has contaminated the gap between the shaft element and the bearing element and that moves in a random fashion.

When the number of relative revolutions is constant and an impedance change occurs cyclically, the abnormal contact rotation state can be determined to have been caused either by the shaft element or the bearing element itself or by a foreign matter rotating synchronously.

In the meantime, a bearing test device in accordance with one embodiment of the present invention may comprise an impedance detection circuit that detects impedance that changes with the contact or non-contact state between the shaft element and the bearing element in a relative rotation state. The impedance detection circuit may be equipped with a voltage application device that applies voltage to one of the shaft element or the bearing element, and an output voltage detection device that detects output voltage from the other; and it can determine based on changes in the output voltage whether the shaft element and the bearing element are in a contact rotation state. For the voltage application device, an alternating voltage application device that applies alternating voltage can be used.

The alternating voltage application device may comprise an excitation electrode placed in close proximity to one of the shaft element or the bearing element and an alternating voltage source that applies alternating voltage to the excitation electrode; and the output voltage detection device can comprise a detection electrode placed in close proximity to the other of the shaft element or the bearing element, and an output voltage detector that detects output voltage provided as output by the detection electrode. The excitation electrode and the detection electrode may be a ring type or a cylinder type.

In this case, in order to increase detection sensitivity, the impedance detection circuit may be a LC resonant circuit with an inductor serially connected between the detection electrode and the ground. In addition, the frequency of the alternating voltage to be applied may be LC resonant frequency. In this situation, the LC resonant frequency can be obtained by monitoring in advance detected voltage waveforms observed in contact and non-contact states, and by switching the frequency so that the waveforms would have the maximum amplitude.

When constructing an impedance detection circuit using a single electrode, the alternating voltage application device may consist of an excitation electrode placed in close proximity to one of the shaft element or the bearing element, an alternating voltage source that applies alternating voltage to the excitation electrode, and a resistor serially connected between the two; and the output voltage detection device may be a voltage detector that detects voltage at both ends of the resistor.

The motor bearing monitoring device in accordance with the present invention may comprise a status detection device that detects the state of motor bearing, an abnormality determination device that determines whether the bearing is in an abnormal state based on the state of the bearing as detected by the status detection device, and an output device that outputs the determination result from the abnormality determination device.

Here, the status detection device may be an impedance detection device that detects impedance of the bearing. In other words, when the first and second bearing elements that rotate relatively and that make up the motor bearing element are in a non-contact rotation state, a constant gap, as well as a fluid film, is formed between them, and the constant gap and the fluid film can be considered a constant resistance and capacitance, respectively; conversely, in the contact rotation state, the first and second bearing elements are in direct contact and there is therefore no substantive resistance or capacitance between them; by taking advantage of these facts and by detecting these electrical changes, it is possible to detect whether the bearing's rotation state is in a contact or non-contact state.

A known AE (Acoustic Emission) method can be used as the status detection method, where an acoustic sensor would detect the acoustics generated by the bearing. Alternatively, a temperature sensor that detects the temperature of the bearing can be used as the status detection method.

For the bearing, one in which a non-contact rotation state via a fluid film is formed when the number of revolutions exceeds a predetermined number of revolutions may be used, and a dynamic pressure bearing would be a representative example of such a type. In this case, when the status detection device is an impedance detection device, the abnormality determination device may, based on changes in impedance, determine the point at which the bearing switches from a contact rotation state to a non-contact rotation state when the motor starts, and determine that there is an abnormality with the bearing when the number of motor revolutions at that point exceeds a predetermined number of float revolutions.

Alternatively, the abnormality determination device may, based on changes in impedance, determine whether the bearing is in a contact rotation state when the motor is in a steady rotation state, and determine that there is an abnormality with the bearing when the bearing is in a contact rotation state or when a momentary contact rotation state occurs repeatedly.

Alternatively, the abnormality determination device may, based on a change in impedance, determine the point at which the bearing switches from a non-contact rotation state to a contact rotation state when the motor is stopping, and determine that there is an abnormality with the bearing when the number of motor revolutions at that point exceeds a predetermined number contact revolutions.

If the abnormality determination device is an acoustic sensor, the abnormality determination device can, based on acoustic sensor output, determine whether the bearing is in a contact rotation state when the motor is in a steady rotation state and determine that there is an abnormality with the bearing when the bearing is in a contact rotation state or when a momentary contact rotation state occurs repeatedly. Alternatively, the abnormality determination device can, based on acoustic sensor output, determine the point at which the bearing switches from a non-contact rotation state to a contact rotation state when the motor is stopping, and determine that there is an abnormality with the bearing when the number of motor revolutions at that point exceeds a predetermined number of contact revolutions.

The impedance detection device employed as the status detection method can comprise a voltage application device that applies voltage, e.g., alternating voltage, to one of the first bearing element and the second bearing element that rotate relatively in a contact rotation state or non-contact rotation state, and an output voltage detection device that detects output voltage from the other. In this case, the abnormality determination device would, based on changes in the output voltage, determine whether the first and second bearing elements are in a contact rotation state.

When the voltage application device is an alternating voltage application device, it can comprise an excitation electrode placed in close proximity to one of the first and second bearing elements and an alternating voltage source that applies alternating voltage to the excitation electrode; and the output voltage detection device can comprise a detection electrode placed in close proximity to the other bearing element and an output voltage detector that detects output voltage provided as output by the detection electrode. The electrodes can be either ring-shaped or cylinder-shaped.

In this case, the impedance detection circuit can be a LC resonant circuit with an inductor serially connected between the detection electrode and the ground. It is desirable to match the frequency of the alternating voltage with the LC resonant frequency in this situation. The LC resonant frequency can be obtained by monitoring in advance the detection output voltage in contact and non-contact states and by adjusting the frequency so that it would have the maximum amplitude.

In the meantime, the present invention also concerns a memory device comprising disk-shaped memory media, a disk driving motor that rotationally drives the memory media, and a head device that performs at least one of the two operations, i.e., recording information on and retrieving information from the memory media; the memory device according to the present invention also comprises a status detection device that detects the status of the disk driving motor bearing, an abnormality determination device that determines whether the bearing is in an abnormal state based on the state of the bearing as detected by the status detection device, and an output device that outputs the determination result from the abnormality determination device.

Here, when the abnormality determination device determines that there is an abnormality with the bearing, it is desirable for the output device to provide as output information that the bearing's life is near its end and that instructs to store the memory in the recording media in another memory medium. Based on such an output, the operator can back up the memory before it becomes unretrievable.

When there is an abnormality with the bearing, it may be preferable to provide an auxiliary recording medium for backup purposes onto which contents recorded on the recording media can be written. It would be convenient to have such an auxiliary recording medium, since there would be no need to have a separate recording medium to perform backups.

When the abnormality determination device determines that there is an abnormality with the bearing, the backup of the contents recorded on the recording media can be conveniently performed without requiring any action on the operator's part, if there is a backup device that would write the contents on the recording medium onto the auxiliary recording medium.

Here, the status detection device may be an impedance detection device that detects impedance of the bearing, an acoustic sensor that detects acoustics generated by the bearing, or a temperature sensor that detects the temperature of the bearing.

Alternatively, the status detection device may be a retry number detection device that detects the number of retry attempts made when recording on or retrieving from the recording media by the head device, and the abnormality determination device can be structured so as to calculate the average number of retry attempts made in a given amount of time based upon the number of detected retry attempts made, and to determine that there is an abnormality with the bearing if the average number of retry attempts made is determined to exceed a predetermined number.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 3(a) and (b) show illustrations for describing an impedance detection circuit of the bearing test device shown in FIG. 1, wherein FIG. 3(a) shows a circuit diagram when the bearing is in a contact rotation state.

FIGS. 13(a) and (b) show illustrations for describing an impedance detection circuit of the motor bearing monitoring device shown in FIG. 11, wherein FIG. 13(a) shows a circuit diagram when the bearing is in a contact rotation state.

FIG. 19 shows two another example of an electrode disposing structure in the motor bearing monitoring device shown in FIG. 11.

DESCRIPTION OF PREFERRED EMBODIMENTS

A bearing test device in accordance with an embodiment of the present invention is described below with references to the accompanying drawings. The bearing test device in the present embodiment is designed to test a bearing section of, for example, a hard disk drive motor in which an oil dynamic pressure bearing is assembled.

Figure 1:
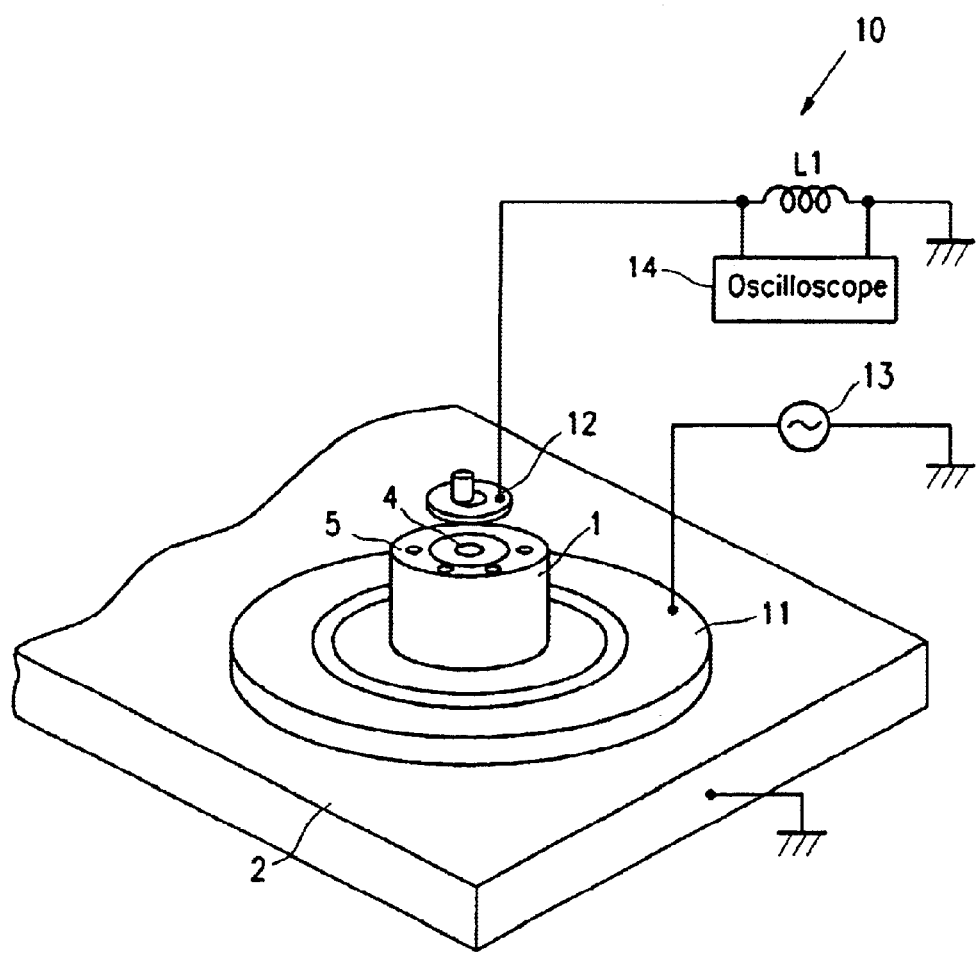
FIG. 1 schematically shows a structure of a bearing test device in accordance with the present invention and a hard disk drive motor to be tested.
Figure 2:
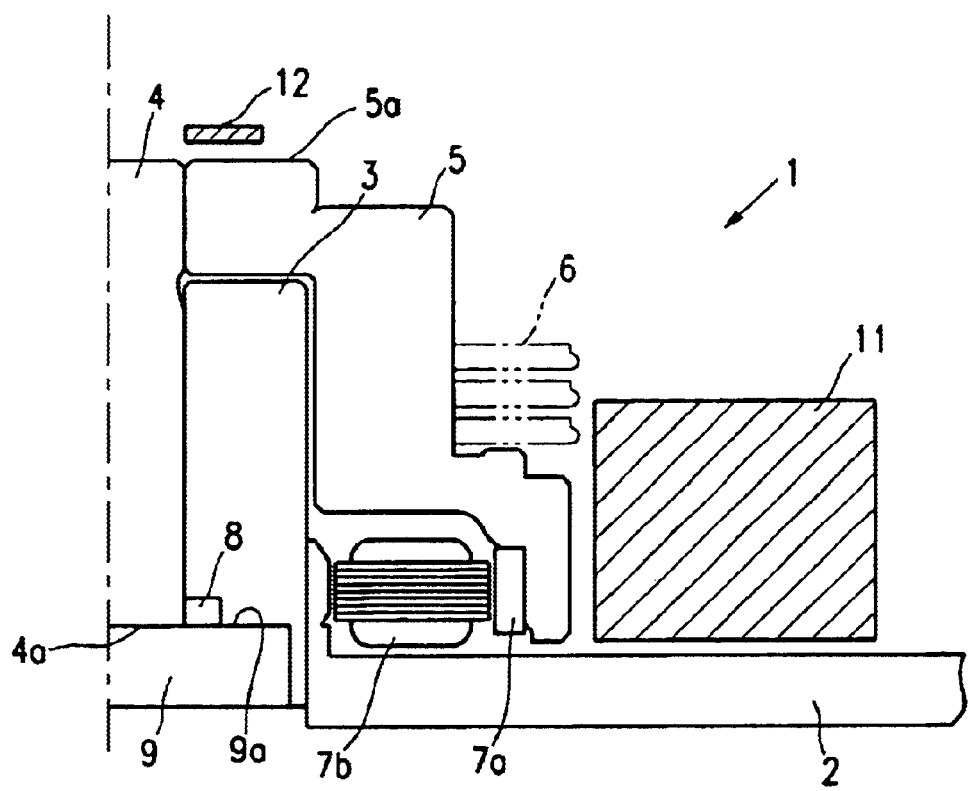
FIG. 2 shows a cross section of a half section of the motor shown in FIG. 1, which indicates the locations of electrodes of the bearing test device.

FIG. 1 schematically shows a structure of a hard disk drive motor with the bearing detection device of the present embodiment mounted thereon, and FIG. 2 is a cross section of a half section of the structure. First, the summary structure of a hard disk drive motor 1 in accordance with the present embodiment will be described with references to these drawings. The motor 1 is equipped with a base plate 2, a sleeve 3 is fixed on the base plate 2 in an upright manner, and in the sleeve 3 is coaxially inserted a rotating shaft 4 in a freely rotatable manner.

The top part of the rotating shaft 4 protrudes upward from the sleeve 3, and a disk hub 5 is fixed on the top part of the rotating shaft 4 concentrically, which is generally cup-shaped and open towards the bottom. Hard disks 6 are mounted on the outer circumference part of the disk hub 5, as indicated by imaginary lines. A ring-shaped rotor 7a is mounted on the inner circumference surface of the bottom part of the disk hub 5; and a stator 7b having a stator core and coils surrounded by the rotor 7a is installed on the base plate side.

Grooves for generating dynamic pressure are formed on the outer circumference surface of the rotating shaft 4 and the inner circumference surface of the sleeve 3 and the gap between the two is filled with lubrication oil, whereby a dynamic pressure bearing is formed. At the bottom of the rotating shaft 4 is fixed a ring-shaped thrust bearing member 8, and a dynamic pressure thrust bearing is formed between a top surface 9a of a counter plate 9 mounted on the base plate side and a bottom surface 4a of the rotating shaft, as well as between the top surface 9a and the bottom surface of the thrust bearing member 8. Therefore, in the motor 1 of the present embodiment, the rotating shaft 4 and the thrust bearing member 8 function as shaft elements, while the sleeve 3 and the counter plate 9 function as bearing elements.

When the motor 1 is driven and the rotating shaft 4 rotates, dynamic pressure is generated by the lubricating oil between the rotating shaft 4 and the sleeve 3 and also between the rotating shaft 4 and the counter plate 9. When the number of revolutions exceeds a predetermined value, the rotating shaft 4 floats up from the sleeve 3 and from the counter plate 9, so that the rotating shaft 4 rotates in a non-contact state. When the number of revolutions decreases and falls below a predetermined value, the rotating shaft 4 rotates once again in contact with the sleeve 3 and the counter plate 9. Such a dynamic pressure bearing mechanism is known, and the description of its detailed structure and actions is omitted.

The various parts of the motor are generally formed by the following materials: the base plate 2 is made of aluminum; the sleeve 3 is made of copper or stainless steel; the rotating shaft 4 is made of stainless steel; the thrust bearing member 8 is made of copper or stainless steel; and the counter plate 9 is made of stainless steel.

Next, a bearing test device 10, whose purpose is to test the number of contact revolutions of the hard disk drive motor 1 having the structure described above, detects the contact and non-contact states of the dynamic pressure bearing section of the motor 1 as changes in impedance. In the present embodiment, changes in impedance are detected based upon changes in resistance or capacitance.

In other words, the lubricating oil used in the dynamic pressure bearing section has volume resistivity of approximately $10^8$ Ωcm through $10^{10}$ Ωcm, and the electric resistance of the oil film part when the rotating shaft 4 is floating up (non-contact rotation state) ranges between several MΩ to several hundred MΩ. Furthermore, since in a floating state the rotating shaft 4 and the sleeve 3 are in close proximity with each other, i.e., metals are in close proximity, and the lubricating oil between them acts as an insulation, there is capacitance of several hundred pF.

In contrast, in the contact rotation state there is a short-circuit state, so that the resistance value falls below several KΩ, which causes both the resistance and capacitance to change. The bearing test device 10 according to the present embodiment detects such changes in resistance and capacitance in the non-contact state and thereby makes it possible to test whether the rotating shaft 4 is in a contact rotation state, the number of its contact revolutions, and whether the rotations are abnormal.

First, referring to FIGS. 1 and 2, the overall structure of the bearing test device 10 according to the present embodiment is described. The bearing test device 10 comprises an excitation electrode 11, a detection electrode 12, an alternating voltage source 13 that applies alternating voltage to the excitation electrode 11, and an oscilloscope 14 that displays detected voltage waveforms detected by the detection electrode 12. The excitation electrode 11 is a ring-shaped electrode placed in close proximity to the disk hub 5 and the base plate 2 of the motor 1 and functions to apply alternating voltage and generate an electric field between the electrode 11 and the base plate 2. The inner circumference surface of the electrode 11 faces the outer circumference surface of the disk hub 5 in a coaxial manner.

The detection electrode 12 may also be a ring-shaped electrode and is placed in close proximity to and in a coaxial manner with a circular top surface 5a of the disk hub 5. The detection electrode 12 is grounded via a serially connected inductor L1. The voltage generated at the inductor L1 can be displayed on the oscilloscope 14.

FIGS. 3(*a*) and (*b*) show the structure of an impedance detection circuit that detects changes in the resistance and capacitance of the dynamic pressure bearing section formed by the motor 1 and the bearing test device 10, when a testing by the bearing test device 10 according to the present embodiment takes place. FIG. 4 is an equivalent circuit of the impedance detection circuit.

As shown in FIGS. 3(*a*) and (*b*), using the excitation electrode 11 and the detection electrode 12, the dynamic pressure bearing section is structured to be equivalent to a circuit structure in which a resistor R1, a capacitor C1 and a switch SW that indicates a contact state or a non-contact state are connected in parallel. In addition, because the electrode 11 is placed in close proximity to the base plate 2 and the disk hub 5, its connections with the base plate 2 and the disk hub 5 can be represented by capacitors C5 and C2 having predetermined capacitances. Similarly, because the electrode 12 is placed in close proximity to the disk hub 5, its connection with the disk hub 5 can be represented by a capacitor C4 having a predetermined capacitance.

Furthermore, the connection between electrodes 11 and 12 can be similarly represented by a capacitor C3 having a predetermined capacitance. As a result, an equivalent circuit shown in FIG. 4 is formed when the motor 1 is tested by the bearing test device 10 according to the present embodiment.

Next, the testing procedure using the bearing test device 10 according to the present embodiment is explained. First, electrodes 11 and 12 are held by jigs (not shown in the figure) and are placed in close proximity to the base plate 2 and the disk hub 5, as shown in FIGS. 1 and 2. In this state, the alternating voltage source 13 is driven and alternating voltage is applied between the electrode 11 and the base plate 2.

For the alternating voltage waveforms, various types of alternating voltage waveforms can be used. For example, such alternating voltage waveforms include sine waveform, rectangular waveform and saw tooth-like waveform.

An electric field is generated by the application of alternating voltage, and the electric line force enters the disk hub 5 and flows through the disk hub 5 to the electrode 12 side placed in close proximity to the disk hub 5, as well as to the ground side via the dynamic pressure bearing section (SW, R1, C1) and the base plate 2. The electric line force components, which flow to the electrode 12 side, flow to the ground side via the inductor L1. The voltage generated at the inductor L1 is displayed on the oscilloscope 14 as the voltage detected by the electrode 12.

Here, the detection sensitivity of the detected voltage can be enhanced by adjusting the frequency of the alternating voltage to match the resonant point while measuring the voltage at the inductor L1 on the oscilloscope 14. In other words, the impedance detection circuit in the present embodiment has a LC resonant circuit structure. Such frequency adjustments can be made while the motor 1 is in a stop state or in s rotation state. Additionally, inductance can be adjusted in order to obtain a LC resonant circuit.

Figure 5:
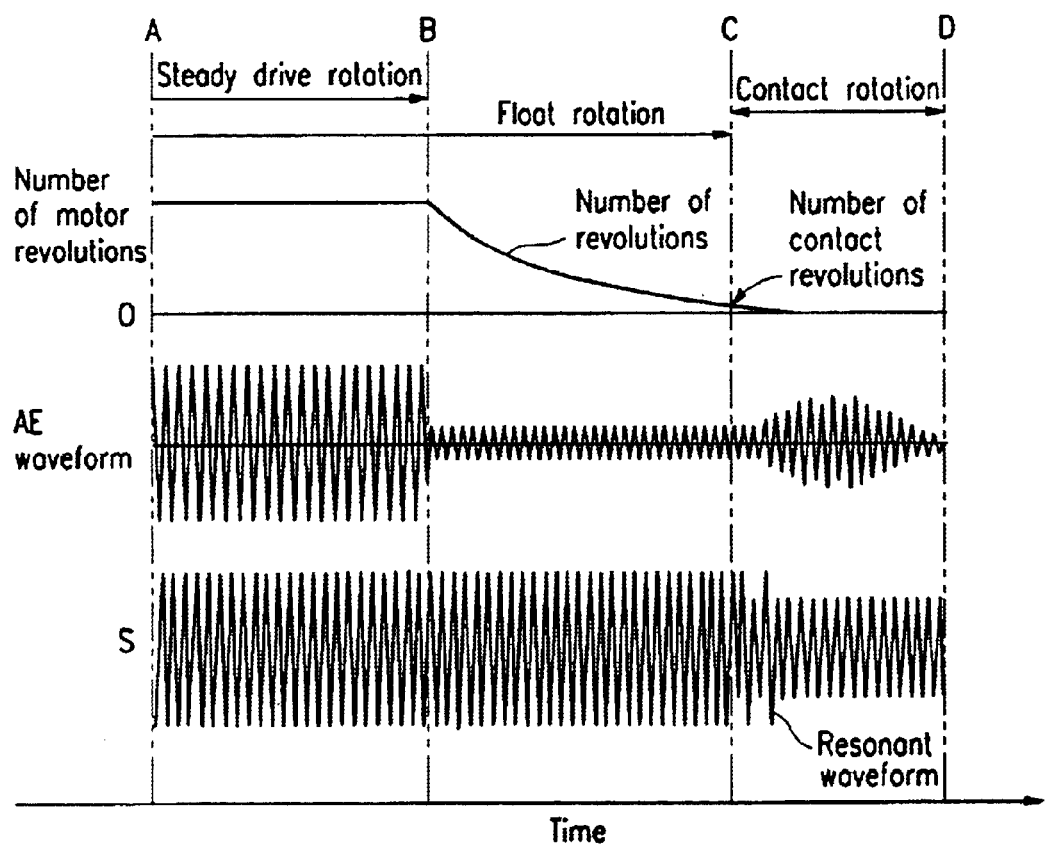
FIG. 5 shows a detected voltage waveform obtained by the bearing test device shown in FIG. 1, the number of motor rotations, and AE waveform obtained by a conventional method.

Next, while monitoring a detected voltage waveform on the oscilloscope 14, the motor 1 is driven to form a rated drive rotation state. Then, the driving of the motor 1 is stopped and the motor 1 is allowed to rotate by force of inertia until it stops. FIG. 5 shows a detected voltage waveform S obtained, as well as the number of motor revolutions (tachometer output voltage) and an AE waveform obtained using the conventional AE method.

To explain the waveform, while the motor 1 is in a rated rotation state (the interval between points A and B), the rotating shaft 4 is floating up in a non-contact rotation state due to the dynamic pressure generated in the dynamic pressure bearing section. The non-contact rotation state is equivalent to a state in which the switch SW is open, as indicated in FIG. 3(b). Consequently, in this state, most of the electric line force components that enter the disk hub 5 enter the detection electrode 12 and flow to the ground side via the inductor L1. As a result, the detected voltage is large and its voltage waveform S has large amplitude.

Even after the driving of the motor 1 is stopped and the motor 1 has shifted to inertial rotation, similar detection output voltage is obtained (the interval between points B and C) while the rotating shaft 4 is floating up and the non-contact rotation state continues, i.e., while the switch SW is open.

Figure 3A:
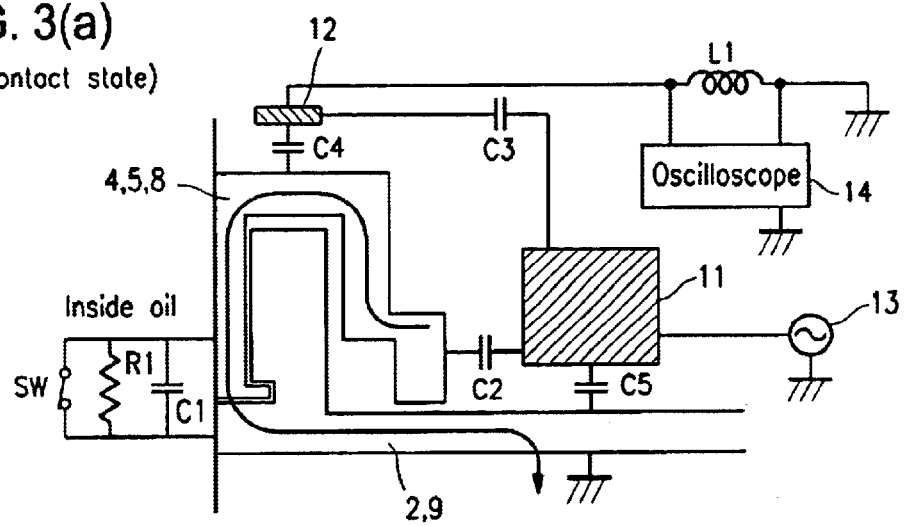
Figure 3B:
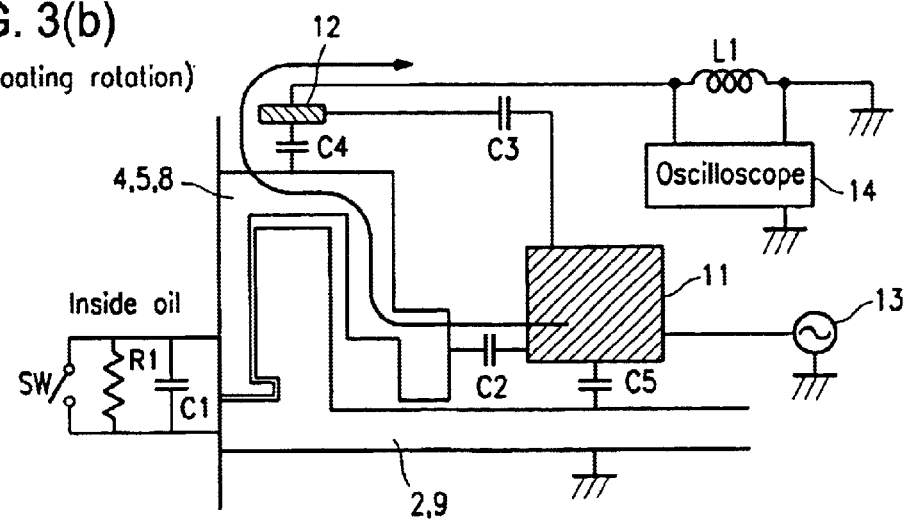
FIG. 3(b) shows a circuit diagram when the bearing is in a non-contact rotation state.
Figure 4:
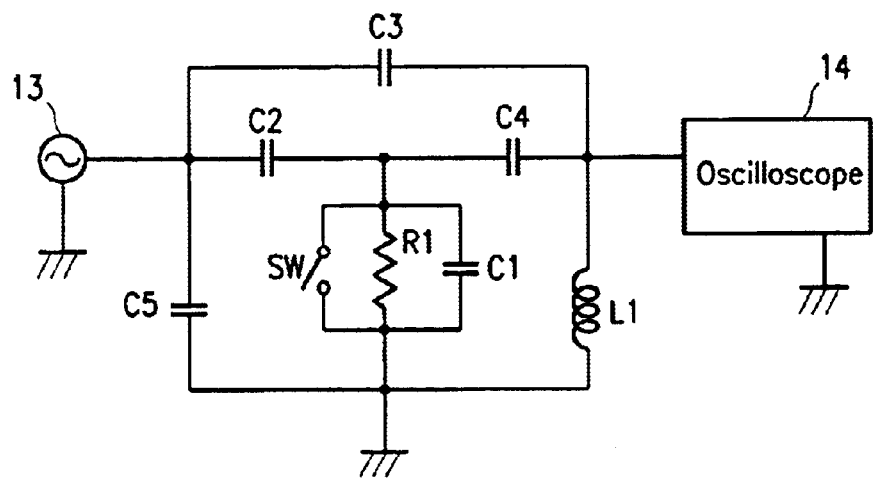
FIG. 4 shows an equivalent circuit diagram of the impedance detection circuit of the bearing test device shown in FIG. 1.

When the rotating shaft 4 comes into contact with the sleeve 3 or the counter plate 9 and shifts to a contact rotation state at point C, the situation becomes equivalent to a state in which the switch SW has closed, as indicated in FIG. 3(a). In this state, most of the electric line force components that enter the disk hub 5 flow to the ground side via the switch SW and the base plate 2. Consequently, the voltage detected by the detection electrode 12 drops sharply, and the amplitude of its voltage waveform S becomes significantly smaller also.

As a result, it is clear from the comparison of the detected voltage waveform S according to the present embodiment with the conventional AE waveform shown in FIG. 5 that, when using the bearing test device 10 according to the present embodiment, there are almost no changes in the detected voltage waveform while the rotating shaft 4 is in the non-contact rotation state (up to point C) and the waveform rapidly becomes smaller with the shift to the contact state. In contrast, the output waveform of the AE waveform becomes smaller when the motor drive stops and grows larger when the shift to the contact state takes place. In this way, the output waveform according to the present embodiment shows significant differences in the output depending on the contact or non-contact state, which allows a high precision detection of the number of contact revolutions as it changes from a non-contact rotation state to a contact rotation state, without error and even with visual check.

The description above concerns detecting the number of contact revolutions when the motor stops, but the number of float revolutions of the dynamic pressure bearing section when the motor starts can also be similarly detected.

The bearing test device 10 according to the present embodiment tests the dynamic pressure bearing section of the motor 1 in a non-contact state. Consequently, the problem of dust attaching to motor parts and contaminating those parts can be avoided.

Of course, because the bearing test device according to the present invention requires only that it be equipped with an impedance detection circuit that can detect impedance changes in the dynamic pressure bearing section, it is possible to provide a motor part, such as the disk hub 5a, with a structure that can contact points of contact. For example, a brush electrode in contact with the outer circumference surface of the top part of the rotating shaft 4 can be used in place of the electrode 12 placed in close proximity.
(Another Embodiment of the Impedance Detection Circuit)

The impedance detection circuit of the bearing test device 10 described above is designed to detect changes in resistance and capacitance of the dynamic pressure bearing section. However, in accordance with another embodiment of the present invention, it is possible to have a structure that would detect resistance changes only or capacitance changes only. Additionally, in accordance with still another embodiment of the present invention, it is possible to perform the detection by using only the excitation electrode 11 and without using the detection electrode 12.

Figure 6:
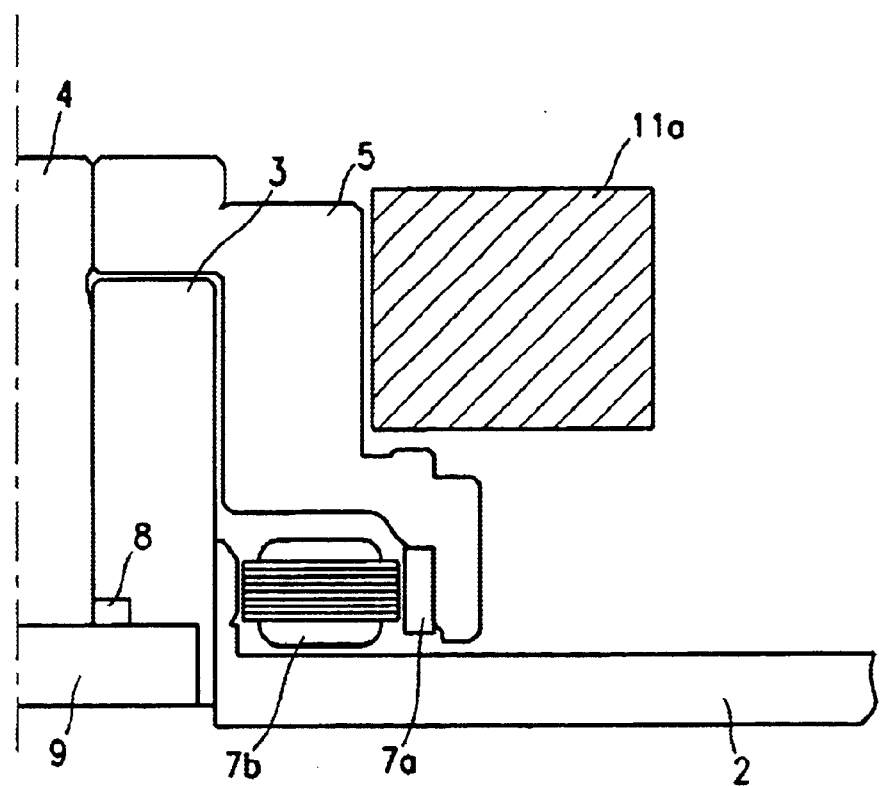
FIG. 6 shows a cross section of a half portion of a motor, which is provided for describing another example of the bearing test device shown in FIG. 1.

FIGS. 6 and 7 are an explanatory illustration and circuit structure of electrode placements in a bearing test device designed to detect the rotation state of the dynamic pressure bearing section based only on resistance changes. As shown in FIGS. 6 and 7, in this case, the only electrode needed is an excitation electrode 11a that applies alternating voltage to a disk hub 5. The electrode 11a is placed in close proximity to the disk hub 5 via a capacitor C2. A resistor R2 is connected in serial between the electrode 11a and an alternating voltage source 13. An oscilloscope 14 detects voltage at both ends of the resistor R2 and displays the voltage at the two ends of the resistor R2. In these figures, components that are identical to components in FIGS. 1 through 4 are assigned the same numbers and their description is omitted.

Figure 7A:
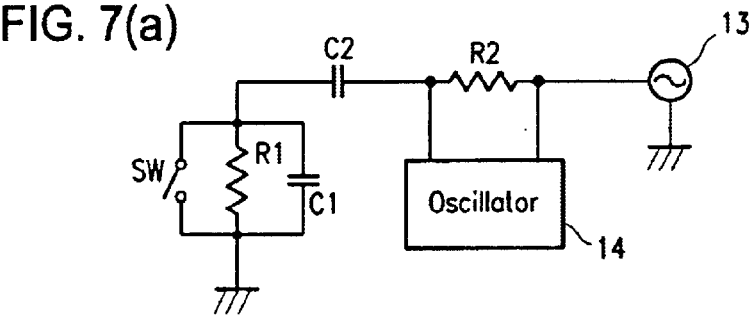
FIGS. 7(a), (b) and (c) show an equivalent circuit diagram of the impedance detection circuit of the bearing test device shown in FIG. 6, a circuit diagram when the bearing is in a contact rotation state, and a circuit diagram when the bearing is in a non-contact rotation state, respectively.
Figure 7B:
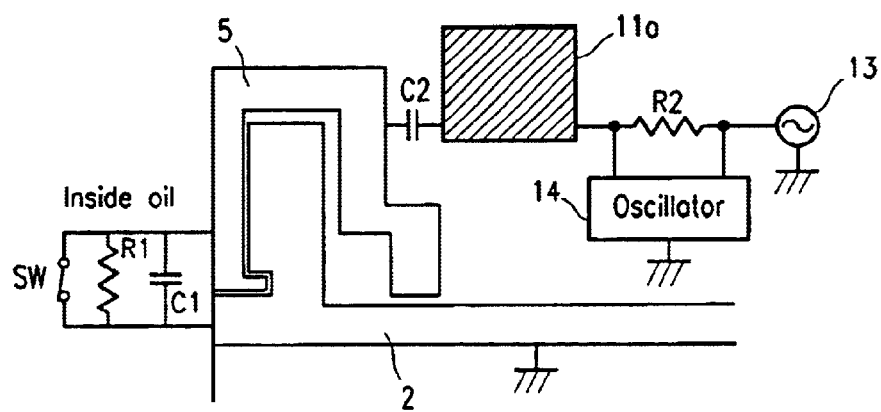
Figure 7C:
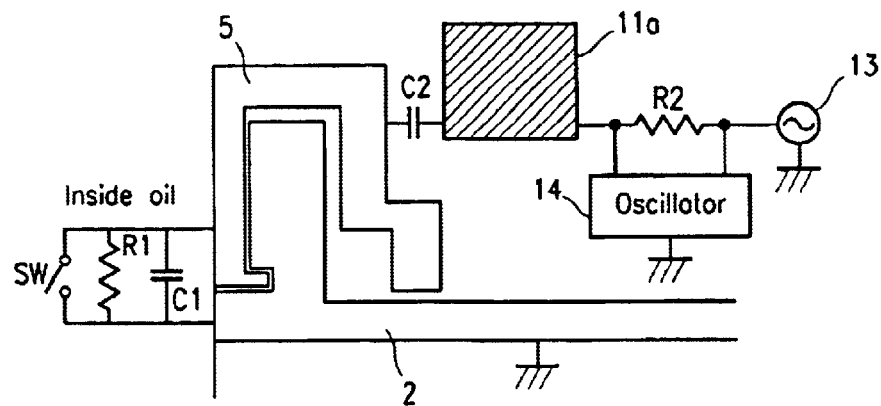

An equivalent circuit thus structured is shown in FIG. 7(a). When the rotating shaft 4 is in a contact state, as shown in FIG. 7(b), most of the electric line force components that flowed from the electrode 11a to the disk hub 5 via the capacitor C2 flow into the ground side via the base plate 2; consequently, a large amount of current flows into the resistor R2, which leads to large voltage values at both ends of the resistor. In contrast, when the rotating shaft 4 is in a non-contact state, as shown in FIG. 7(c), the switch SW is off and the circuit is substantially in a shut-off state, which makes the amount of current that flows into the resistor R2 small, which in turn makes the detected voltage extremely small.

Figure 8:
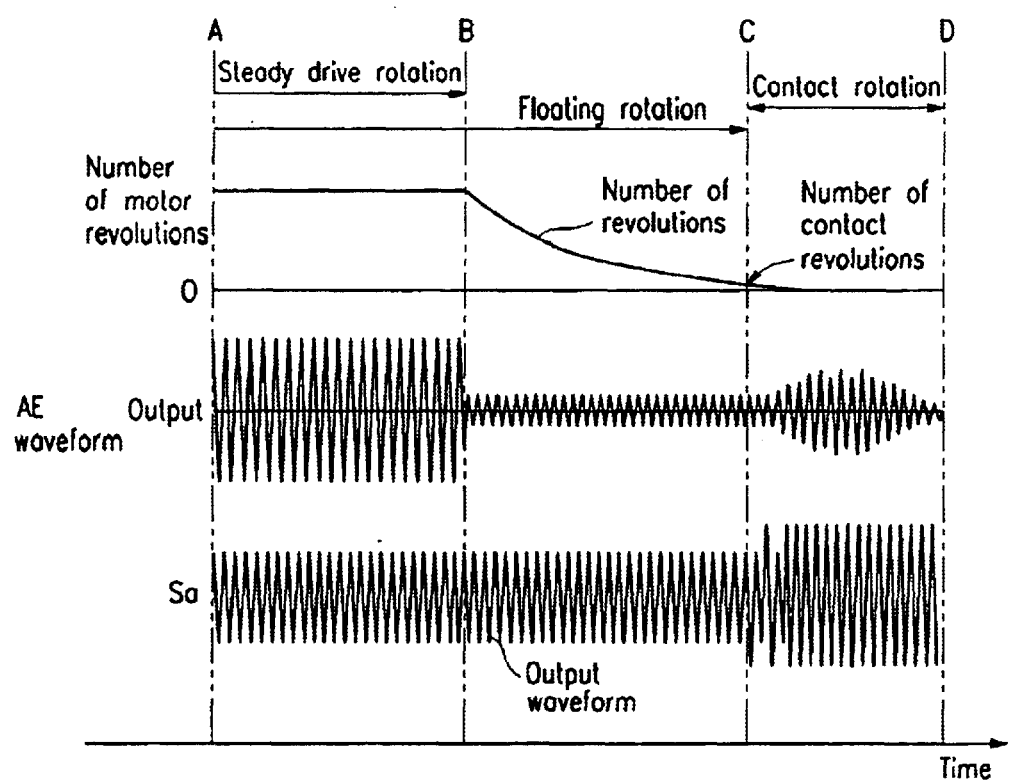
FIG. 8 shows a detected voltage waveform obtained by impedance detection circuit shown in FIG. 7, the number of motor rotations, and an AE waveform obtained by a conventional method.

FIG. 8 shows a detected voltage waveform Sa observed when the motor 1 is driven in a state similar to the one in FIG. 5, as well as a curve representing the number of motor revolutions and a conventional AE waveform. Each of the states between point A and point D is the same as in FIG. 5. Contrary to the detected voltage waveform S in FIG. 5, the detected voltage waveform Sa becomes small in a non-contact rotation state and becomes dramatically larger when the shift to a contact rotation state takes place. In this case also, the number of contact revolutions can be detected more accurately than with the conventional AE waveform.

When the structure is designed to detect resistance changes only as shown in FIGS. 6 through 8, there is an advantage of simplified circuit structure compared to the structure shown in FIGS. 1 through 5. In addition, the structure with only the excitation electrode 11 is also extremely simple.

Furthermore, in the above description, alternating voltage is applied to the disk hub 5 side, but it may be applied to the base plate 2 side. When using a detection terminal to make the contact for detection instead of a non-contact type electrode, direct voltage instead of alternating voltage may be applied.

Moreover, it goes without saying that detection can be conducted in a state in which the hard disks 6 are mounted on the disk hub 5. Moreover, the hard disks 6 being mounted on the disk hub 5 provide an added advantage of having the gap between the electrode 11a and the base plate 2 securely shielded by the hard disks.

(Variation of the Electrode Structure)

In the embodiments above, the electrodes 11 and 12 or the electrode 11a are placed in close proximity to the motor 1. However, it may be desirable to eliminate these electrode members if possible, since the elimination of the electrodes would simplify the structure of the test device and the wiring structure. One example of eliminating electrode members as applied to the hard disk drive motor 1 having a structure shown in FIGS. 1 and 2 is to use the counter plate 9 as an electrode.

Figure 9:
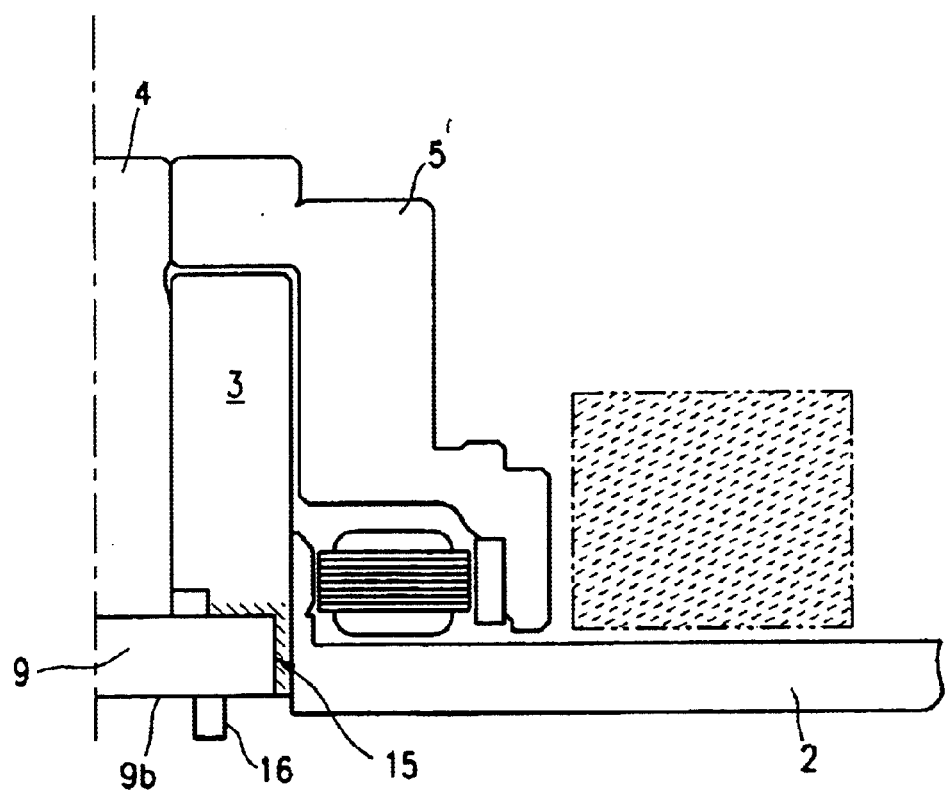
FIG. 9 shows a cross section of a half section of a motor, which indicates the locations of electrodes of another example of the bearing test device shown in FIG. 1.

In this case, as indicated by a shaded area 15 in FIG. 9, the sleeve 3 and the counter plate 9 are electrically insulated from each other and an electric contact 16 of the bearing test device is in contact with an under surface 9b of the counter plate 9. The counter plate 9 can also be used as the excitation electrode 11 or 11a or as the detection electrode 12 in the embodiments above.

(Detection of Abnormal Rotation in the Dynamic Pressure Bearing Section)

The above description is applicable when detecting the number of contact revolutions (or the number of float revolutions) of the dynamic pressure bearing section using the bearing test device according to the present invention. However, it is possible to detect more broad, general abnormal rotation states, using the bearing test device according to the present invention.

Figure 10:
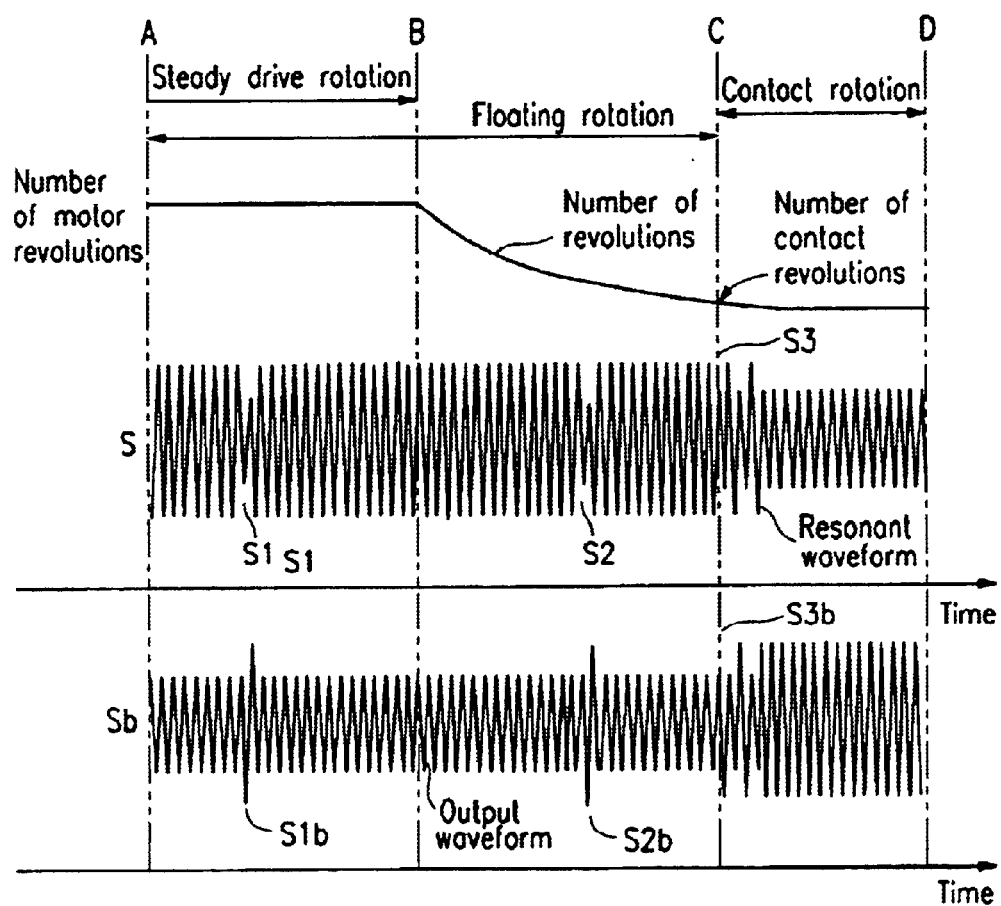
FIG. 10 shows a detected voltage waveform obtained by the bearing test device shown in FIG. 1 in an abnormal rotation state caused by entered foreign matters, a waveform obtained after the aforementioned waveform is converted, and the number of motor revolutions.

A typical example of an abnormal rotation state is caused by contamination of the dynamic pressure bearing section by foreign matter, such as metal powder. In such a case, when the disk driving motor 1 is in a rated rotation state, the rotating shaft 4 may be in a non-contact state, but because of the foreign matter it would momentarily switch to a contact state in an irregular manner, and corresponding detected voltage would be output. In the case of the bearing test device 10, which was described with references to FIGS. 1 through 5, small waveform parts s1 and s2 with small amplitude appear momentarily in the detected voltage waveform S while in the steady drive rotation state (floating or non-contact rotation state), as shown in FIG. 10 (where each of the points A through D in FIG. 10 are identical to those in FIG. 5). Therefore, by visually checking these waveform parts or by identifying them with a detection circuit that includes a comparator, abnormal rotation caused by foreign matter contamination of the bearing can be tested.

Abnormal rotation states can be caused by reasons other than contamination by foreign matter. For example, if there is eccentric rotation caused by manufacturing error or assembly error of the rotating shaft 4 and/or the sleeve 3, these elements can come in momentary contact with each other cyclically. In such a case, waveform parts s1 and s2 appear cyclically (regularly) in the steady rotation state. Consequently, by checking these waveform parts, whether there is an abnormal rotation state can be tested.

(Conversion of Detected Voltage Waveform)

Due to the fact that waveform parts that indicate such abnormal rotation states occur only momentarily, they are likely to be overlooked if the detected voltage waveform S is displayed unaltered on the oscilloscope. In addition, in detecting the number of contact revolutions as in an earlier embodiment, when the number of revolutions of the motor drops and approaches to the number of contact revolutions of the bearing, short and intermittent contacts between the bearing elements occur in an initial stage, then contacts between the bearing elements gradually become longer, and the bearing finally reaches a steady contact rotation state. The number of contact revolutions used for analysis may be taken from the initial stage, when momentary contacts just begin to appear. Consequently, when the detected voltage waveform is used unaltered, the number of contact revolutions may not be accurately detected.

For example, as shown in FIG. 10, by waveform-converting the detected voltage waveform S so that the amplitude sizes are reversed as in a voltage waveform Sb, the waveform parts s1b and s2b that appear irregularly can be identified without being overlooked. Also, when detecting the number of contact revolutions, a waveform part S3b, which is the first momentary contact position, would be identified without being overlooked.

Known waveform conversion and/or shaping methods that utilize an AM demodulation circuit, a phase contrast sensor circuit or an envelope circuit can be used as the waveform conversion methods that would make such visual recognition easier are.

(Bearings that Can Be Tested)

The preceding description concerns embodiments in which the present invention is applied to the testing of dynamic pressure bearings, but bearings other than dynamic pressure bearings can also be the subject of tests. For example, sliding bearings such as sintered bearings made from sintered bodies containing solid lubricating material, or roll bearings such as ball bearings in which rolling members are inserted, can be subject to test for abnormal rotation. Furthermore, it goes without saying that dynamic pressure bearings that can be tested include dynamic pressure bearings that use high resistance fluids and gases such as air and water, in addition to oil dynamic pressure bearings that use oil as the fluid.

Further, in the embodiments above the present invention is applied to the testing of dynamic pressure bearings assembled into hard disk drive motors, but the present invention can also be applied to test bearing sections in other devices as well. For example, the present invention can be applied to test the rotating part of an optical scanning device that scans while rotating a polygon mirror, the rotating part of a photosensitive drum of a copier, or the rotating part of an oil circulation pump.

Next, an embodiment of a hard disk drive in which a motor bearing monitoring device according to the present invention is assembled will be explained. The hard disk drive in this embodiment is equipped with a disk driving motor in which an oil dynamic pressure bearing is assembled.

Figure 11:
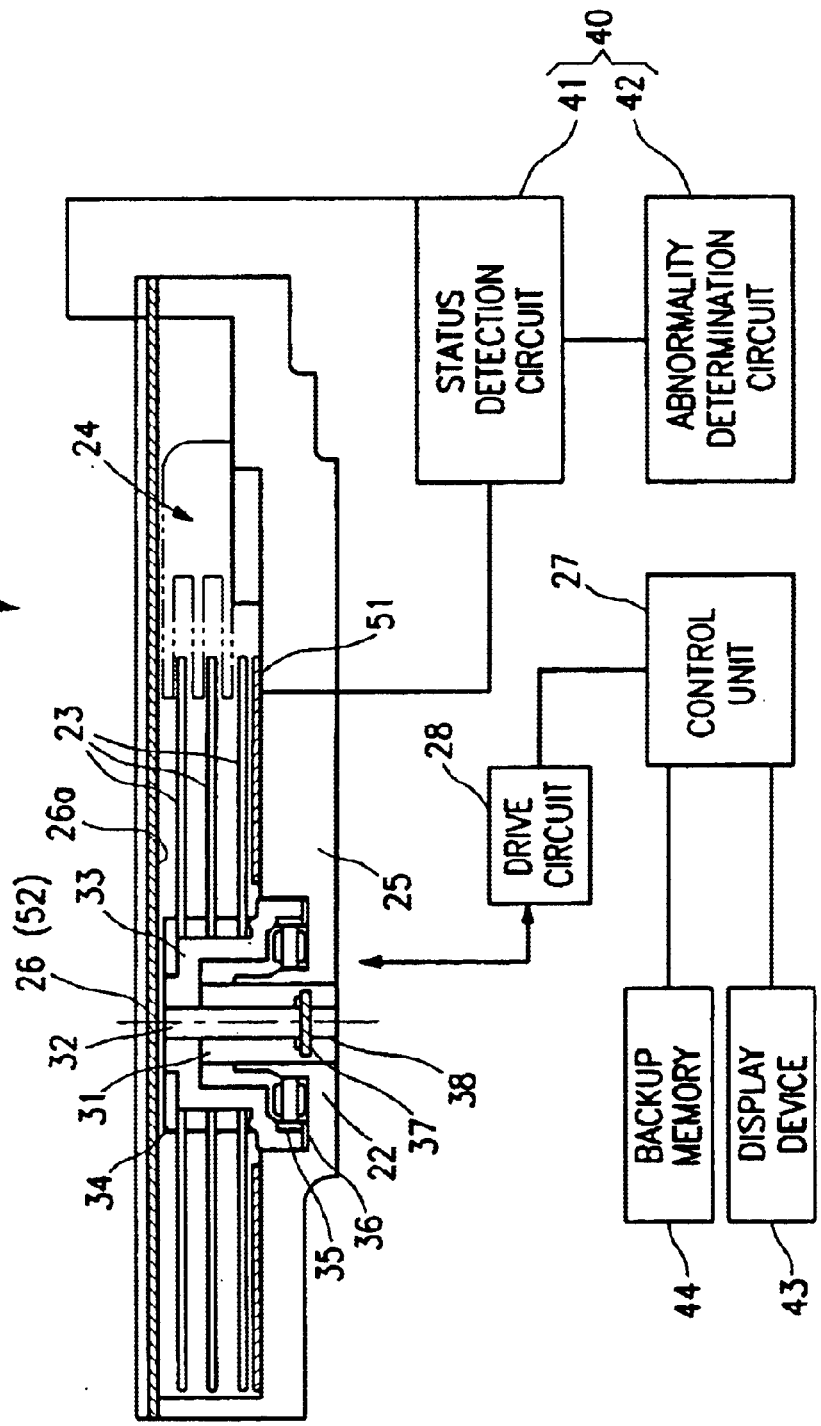
FIG. 11 schematically shows a structure of an example of a hard disk driver in which a motor baring monitoring device of the present invention is implemented.
Figure 12:
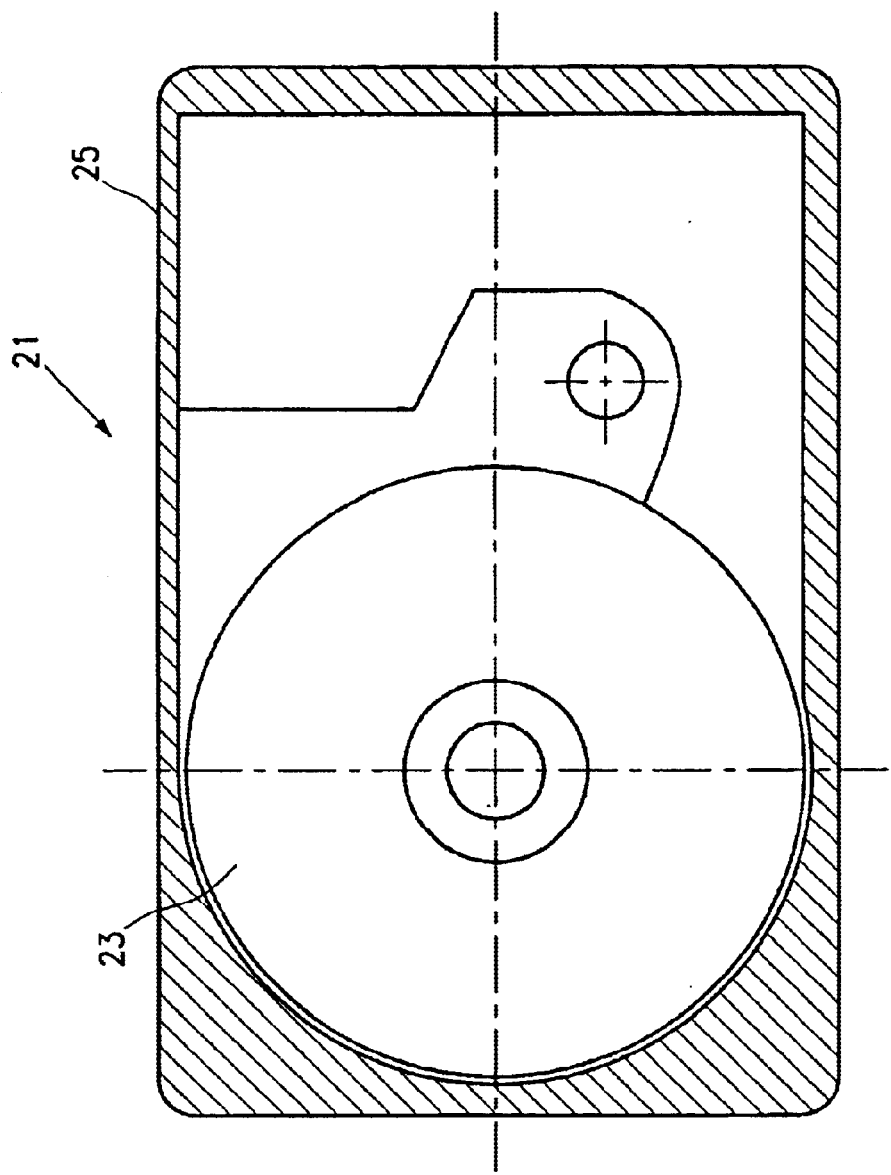
FIG. 12 schematically shows a plan view of a structure of the motor shown in FIG. 11.

FIG. 11 schematically shows a cross section of a structure of a hard disk drive 21 according to the present embodiment along with a control system, and FIG. 12 schematically shows a plan view of the hard disk drive 21. The hard disk drive 21 in this embodiment is equipped with a disk driving motor 22, a plurality of magnetic disks 23 that is rotationally driven by the disk driving motor 22, and a magnetic head 24 that records information on and retrieves information from the magnetic disks 23. These component parts are assembled into a motor case compartmentalized by a flat cup-shaped base 25 that opens toward the top and a lid 26 that closes this top opening.

The hard disk drive 21 may be built in or attached externally to a control unit such as a personal computer 27 and recording and retrieval take place by the control unit 27 via a drive circuit 28.

The disk driving motor 22 in the present embodiment is equipped with an upright sleeve 31 that forms a unitary structure with the base 25 and a rotating shaft 32 inserted coaxially into the sleeve 31 in a freely rotatable manner. The top part of the rotating shaft 32 protrudes upward from the sleeve 31, and on the top part is fixed concentrically a disk hub 33, which is generally cup-shaped and open towards the bottom. On the outer circumference part of the disk hub 33 is mounted the magnetic disk 23 by a clamp 34.

A ring-shaped rotor 35 is mounted on the inner circumference surface of the bottom part of the disk hub 33; and a stator 36 comprising a stator core and coil is surrounded by the rotor 35 and installed on the base 25 side.

Grooves for dynamic pressure generation are provided on the outer circumference surface of the rotating shaft 32 and the inner circumference surface of the sleeve 31, and the gap between the two is filled with lubrication oil, whereby forming a dynamic pressure bearing. A ring-shaped thrust bearing member 37 is fixed at the bottom of the rotating shaft 32, and a dynamic pressure thrust bearing is formed between the bottom surface of a bearing member 37 and the top surface of a counter plate 38 mounted on the base 25. Therefore, in the disk driving motor 22 of the present embodiment, the rotating shaft 32 and the thrust bearing member 37 function as one of first and second bearing elements, while the sleeve 31 and the counter plate 38 function as the other bearing element.

When the motor 22 is driven and the rotating shaft 32 rotates, dynamic pressure is generated between the rotating shaft 32 and the sleeve 31 and also between the rotating shaft 32 and the counter plate 38 by the lubricating oil. When the number of revolutions exceeds a certain value (the number of float revolutions), the rotating shaft 32 floats up from the sleeve 31 and from the counter plate 38, so that the rotating shaft 32 rotates in a non-contact state. When the number of revolutions decreases and falls below a predetermined value (the number of contact revolutions), the rotating shaft 32 rotates once again in contact with the sleeve 31 and the counter plate 38 (a contact rotation state). Such a dynamic pressure bearing mechanism is known, and the description of its detailed structure and actions is omitted.

Various parts of the motor are generally formed by the following materials. For example, the base 25 is made of aluminum; the sleeve 31 is made of copper or stainless steel; the rotating shaft 32 is made of stainless steel; the thrust bearing member 37 is made of copper or stainless steel; and the counter plate 38 is made of stainless steel.

The hard disk drive 21 of the present embodiment is equipped with a motor bearing monitoring device 40 that monitors the rotation state of the dynamic pressure bearing section of the hard disk drive 21 and displays abnormalities if any occurs. The motor bearing monitoring device 40 of the present embodiment is equipped with a status detection circuit 41 that detects the rotation state of the dynamic pressure bearing section, an abnormality determination circuit 42 that determines whether there is an abnormality with the dynamic pressure bearing section based on detection output from the status detection circuit 41, and a display device 4 that displays abnormalities if any occurs. Each of these circuit parts is driven and controlled by the control unit 27. Additionally in the present embodiment, there is a backup memory 44 under the control of the control unit 27 used to transfer recorded data on the magnetic disks 23 in the event of an abnormality.

As described previously, the motor bearing monitoring device 40 detects the contact and non-contact states of the dynamic pressure bearing section of the disk driving motor 22 based on impedance changes, more specifically resistance and capacitance changes.

In other words, as shown in FIGS. 11 and 13, the status detection circuit 41 of the motor bearing monitoring device 40 according to the present embodiment comprises an excitation electrode 51, a detection electrode 52, an alternating voltage source 53 that applies alternating voltage to the excitation electrode 51, and a voltage detector 54 that outputs the detected voltage obtained from the detection electrode 12 to the abnormality determination circuit 42. The excitation electrode 51 is a ring-shaped electrode placed in close proximity to the base 25 of the disk driving motor 22 and functions to apply alternating voltage and generate an electric field between the electrode 51 and the base 25. The inner circumference surface of the electrode 51 faces the outer circumference surface of the disk hub 33 in a coaxial manner.

The detection electrode 52 of the present embodiment is also the lid 26. In one embodiment, an insulating film 26a made from plastic is formed on the inner surface of the lid 26. The insulating film 26a electrically insulates the lid 26 from the base 25, and at the same time places the lid 26 in close proximity to the top surface of the rotating shaft 32 and of the disk hub 33. The detection electrode 52 is grounded via a serially connected inductor L1. The voltage generated at the inductor L1 can be detected by the voltage detector 54.

Figure 13A:
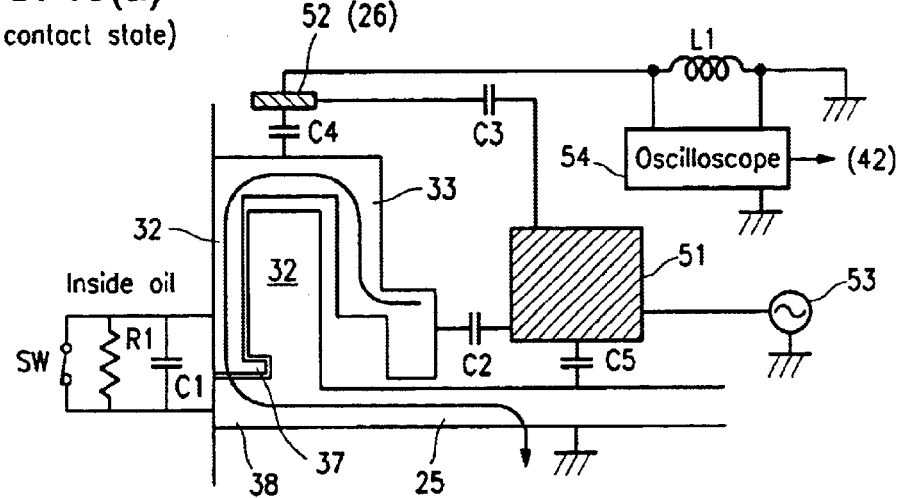
Figure 13B:
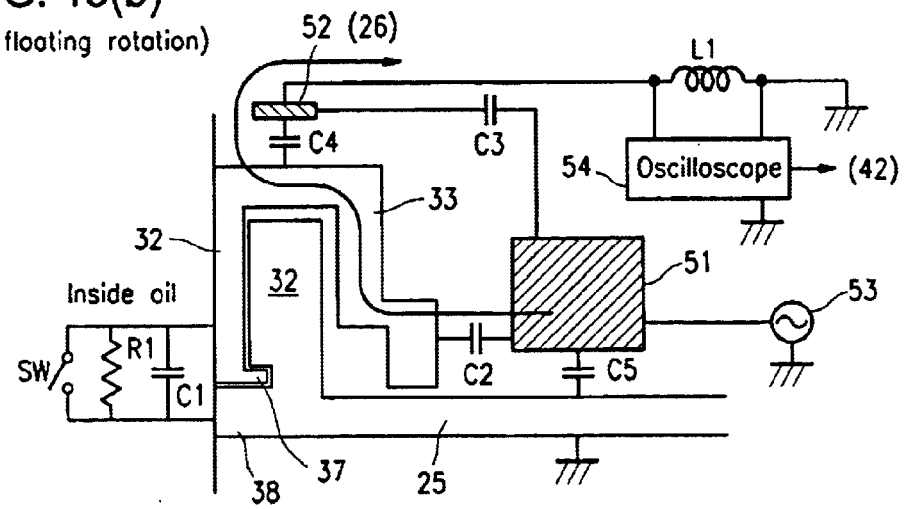
FIG. 13(b) shows a circuit diagram when the bearing is in a non-contact rotation state.
Figure 14:
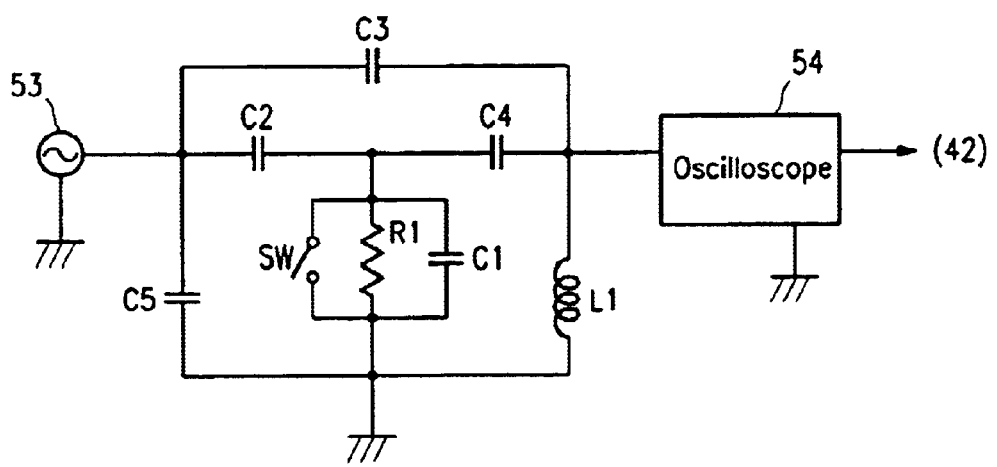
FIG. 14 shows an equivalent circuit diagram of the impedance detection circuit of the motor bearing monitoring device shown in FIG. 11.

As shown in FIGS. 13 and 14, using the excitation electrode 51 and the detection electrode 52, the dynamic pressure bearing section is structured to be equivalent to a circuit structure in which a resistor R1, a capacitor C1 and a switch SW that indicates contact or non-contact state are connected in parallel. In addition, because the electrode 51 is placed in close proximity to the base 25 and the disk hub 33, its connections with the base 25 and the disk hub 33 can be represented by capacitors C5 and C2 having predetermined capacitances. Similarly, because the electrode 52 (the lid 26) is placed in close proximity to the disk hub 33, its connection with the disk hub 33 can be represented by a capacitor C4 having a predetermined capacitance. Furthermore, the connection between the electrodes 51 and 52 can be similarly represented by a capacitor C3 having a predetermined capacitance. As a result, the status detection circuit 41 of the present embodiment is also an impedance detection circuit having an equivalent circuit shown in FIG. 14.

Next, the motor bearing monitoring operation in the hard disk drive 1 of the present embodiment will be explained with reference to a flow chart in FIG. 15. The signal waveform is the same as the one in FIG. 5 already explained, and its explanation will be omitted here. First, an alternating voltage source 53 is driven and alternating voltage is applied between the electrode 51 and the base 25. For the alternating voltage waveforms, various types of alternating voltage waveforms can be used, including sine waveform, rectangular waveform and saw tooth-shaped waveform.

An electric field is generated by the application of alternating voltage, and the electric line force that entered the disk hub 33 flows through it to the electrode 52 side placed in close proximity, as well as to the ground side via the dynamic pressure bearing section (SW, R1, C1) and the base 25. The electric line force components that flowed to the electrode 52 (the lid 26) side flow to the ground side via the inductor L1. The voltage generated at the inductor L1 is detected by the voltage detector 54.

The detection sensitivity of the detected voltage can be enhanced by adjusting the frequency of the alternating voltage to match the resonant point while measuring the voltage at the inductor L1 on an oscilloscope. In other words, the impedance detection circuit in the present embodiment has an LC resonant circuit structure. Such frequency adjustments can be made while the motor 22 is in stop state or in rotation state. Additionally, inductance can be adjusted in order to obtain an LC resonant circuit.

The output voltage detected by the voltage detector 54 is supplied to the abnormality determination circuit 42. When the disk driving motor 22 starts, the abnormality determination circuit 42 determines, based on the detected voltage waveform, the point at which the dynamic pressure bearing section shifts from a contact rotation state to a non-contact rotation state, and finds the number of motor revolutions (the number of float revolutions) at that point (step ST 1-1 in FIG. 15). It also determines the rotation status of the dynamic pressure bearing section (whether it is in a contact rotation state or in a non-contact rotation state) based similarly on the output voltage waveform, when the disk driving motor 22 is in a steady rotation state (step ST 1-2). Furthermore, when the disk driving motor 22 stops, while the motor rotates subsequently by the force of inertia, the abnormality determination circuit 42 determines the point at which the dynamic pressure bearing section shifts from a non-contact rotation state to a contact rotation state and finds the number of motor revolutions (the number of contact revolutions) at that point (step ST 1-3).

At this time, the detected voltage waveform S is identical to the detected voltage waveform S in FIGS. 5 and 10.

Referring to these waveform diagrams, while the disk driving motor 22 is in a steady rotation state (the interval between points A and B), the rotating shaft 32 is floating up in a non-contact rotation state due to the dynamic pressure generated in the dynamic pressure bearing section. The non-contact rotation state is equivalent to a state in which the switch SW is open, as indicated in FIG. 13(b). In this state, most of the electric line force components that entered the disk hub 33 enter the detection electrode 52 (the lid 26) and flow to the ground side via the inductor L1. As a result, the detected voltage is large and its voltage waveform S has large amplitude.

Even after the driving of the disk driving motor 22 has been stopped and it has shifted to inertial rotation, the rotating shaft 32 continues to be in a floating. While the rotating shaft 32 continues to be in a floating non-contact rotation state, similar detection output voltage is obtained (the interval between points B and C).

When the rotating shaft 32 comes into contact with the sleeve 31 or the counter plate 38 and shifts to a contact rotation state at point C, the situation becomes equivalent to a state in which the switch SW is closed, as indicated in FIG. 13(a). In this state, most of the electric line force components that entered the disk hub 33 flow to the ground side via the switch SW and the base 25. Consequently, the voltage detected by the detection electrode 52 (the lid 26) drops sharply, and the amplitude of its voltage waveform S becomes significantly smaller also.

The abnormality determination circuit 42 compares the actual, detected number of float revolutions and of contact revolutions against the number of float revolutions and of contact revolutions, respectively, stored in memory, and when the actual numbers of revolutions are higher than the numbers of revolutions in memory it determines that an abnormality has occurred in the dynamic pressure bearing section (step ST 2 in FIG. 15) and has this information displayed on a display device 43 via the control unit 27. Additionally, it causes a message to backup data recorded on the hard disk to be also displayed on the display device 43 (step ST 3-2 in FIG. 15).

Figure 15:
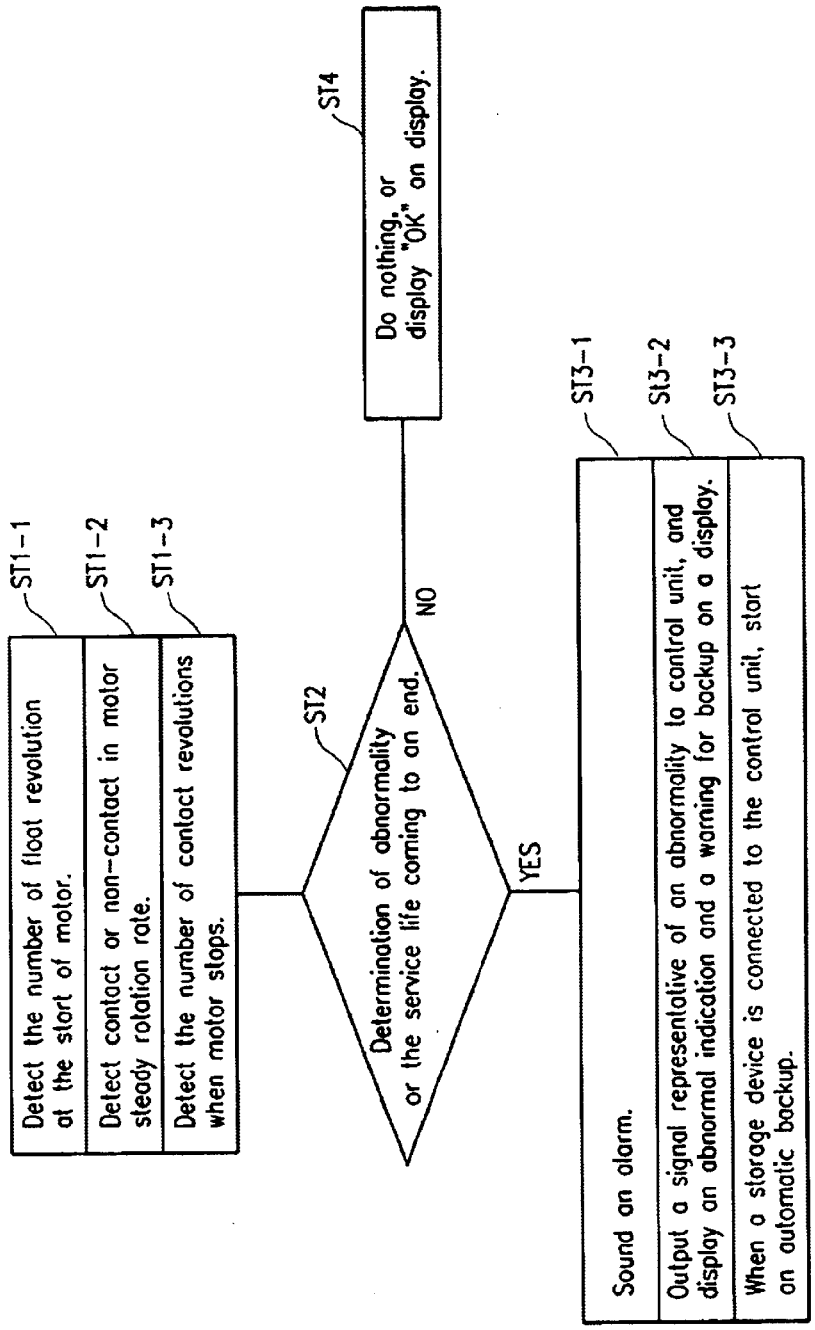
FIG. 15 schematically shows a flow chart of an operation for determining abnormality with a bearing, which is performed by the motor bearing monitoring device shown in FIG. 11.

Here, when an abnormality is detected, it may be arranged to have this detected information displayed on the display device 43 and the recorded data on the hard disk backed up automatically on the backup memory 44 (step ST 3-3 in FIG. 15). When the control unit 27 is provided in the form of a personal computer, the speaker function of the personal computer can be used or a buzzer can be separately attached to have an alarm sound when an abnormality occurs (step ST 3-1 in FIG. 15). Of course, instead of appealing to visual and auditory senses, or in conjunction with such alarm outputs, a vibrator can be used to warn of an abnormal situation by vibration.

When no abnormality is detected, there would not be any of the alarm outputs as described above; however, a space to display the status of the hard disk drive can be created on the screen of the display device 43 to display "OK" in normal states (step ST 4 in FIG. 15).

Next, detecting abnormalities in a steady rotation state will be explained. A typical example of an abnormal rotation state is caused by contamination of the dynamic pressure bearing section by foreign matter, such as metal powder. In such a case, when the disk driving motor 22 is in a steady rotation state, the rotating shaft 32 may be in a non-contact state, but because of the foreign matter it would momentarily switch to a contact state in an irregular manner, and corresponding detected voltage would be output.

In such a case, waveform parts s1 and s2 with small amplitude appear momentarily in the detected voltage waveform S while the disk driving motor 22 is in the steady drive rotation state (a floating or non-contact rotation state), as shown in FIG. 10. Therefore, when such waveform parts are detected, the abnormality determination circuit 42 determines that the bearing is in an abnormal rotation state caused by contamination by foreign matter and outputs to the control unit 27 the information representing that an abnormality has occurred.

Abnormal rotation states can be caused by reasons other than contamination by foreign matter. For example, if there is eccentric rotation caused by manufacturing error or assembly error of the rotating shaft 32 and/or the sleeve 31, they can come in momentary contact with each other cyclically. In such a case, waveform parts s1 and s2 appear cyclically (regularly) in the steady rotation state. The abnormality determination circuit 42 of the present embodiments outputs to the control unit 27 a signal representing that an abnormality has occurred in this situation as well.

Due to the fact that waveform parts that indicate such abnormal rotation states occur only momentarily, the abnormalities are not always determined with high precision if the detected voltage waveform S is waveform-analyzed unaltered by the abnormality determination circuit 42. In addition, in detecting the number of contact revolutions in an earlier embodiment, when the number of motor revolutions drops and the bearing reaches the number of contact revolutions, short and intermittent contacts gradually become longer contacts and there is a shift to a steady contact rotation state. The number of contact revolutions used for analysis may be from the initial stage, when momentary contacts just begin to appear. As a result, when the detected voltage waveform is analyzed unaltered, the number of contact revolutions may not be detected through waveform analysis with high precision.

In order to avoid such a problem, by waveform-converting the detected voltage waveform S so that the amplitude sizes are reversed as in voltage waveform Sb, as well as by amplifying the amplitude differences, as shown in FIG. 10, the waveform parts S1b and S2b that appear irregularly can be identified without being overlooked. Also, when trying to detect the number of contact revolutions, the waveform part S3b, which is the first momentary contact position, can be identified without being overlooked. Known waveform conversion and/or shaping methods that utilize an AM demodulation circuit, a phase contrast sensor circuit or an envelope circuit may be used as such waveform conversion methods.

The motor bearing monitoring device 40 of the present embodiment tests the dynamic pressure bearing section of the disk driving motor 22 in a non-contact state. Consequently, the problem of dust attaching to motor parts and contaminating those parts can be avoided.

Of course, as an impedance detection circuit that can detect impedance changes in the dynamic pressure bearing section, it is possible to utilize a structure in which a motor part, such as the disk hub 33, contacts the point of contact. For example, a brush electrode in contact with the outer circumference surface of the top part of the rotating shaft 32 can be used in place of the electrode 52 placed in close proximity.

The status detection and abnormality determination of the bearing when the motor is in a steady rotation state can be performed at a regular interval. Additionally, it is desirable not to perform status detection, i.e., apply alternating voltage, while the magnetic head 24 is driving in order to prevent problems in the retrieval or recording operation by the magnetic head 24.

(Another Embodiment of the Impedance Detection Circuit)

The impedance detection circuit (42) of the motor bearing monitoring device 40 described above is designed to detect changes in resistance and capacitance of the dynamic pressure bearing section, but it is possible to have a structure that would detect resistance changes only or capacitance changes only. Additionally, it is possible to perform the detection by using only the excitation electrode 51 and without using the detection electrode 52.

Figure 16:
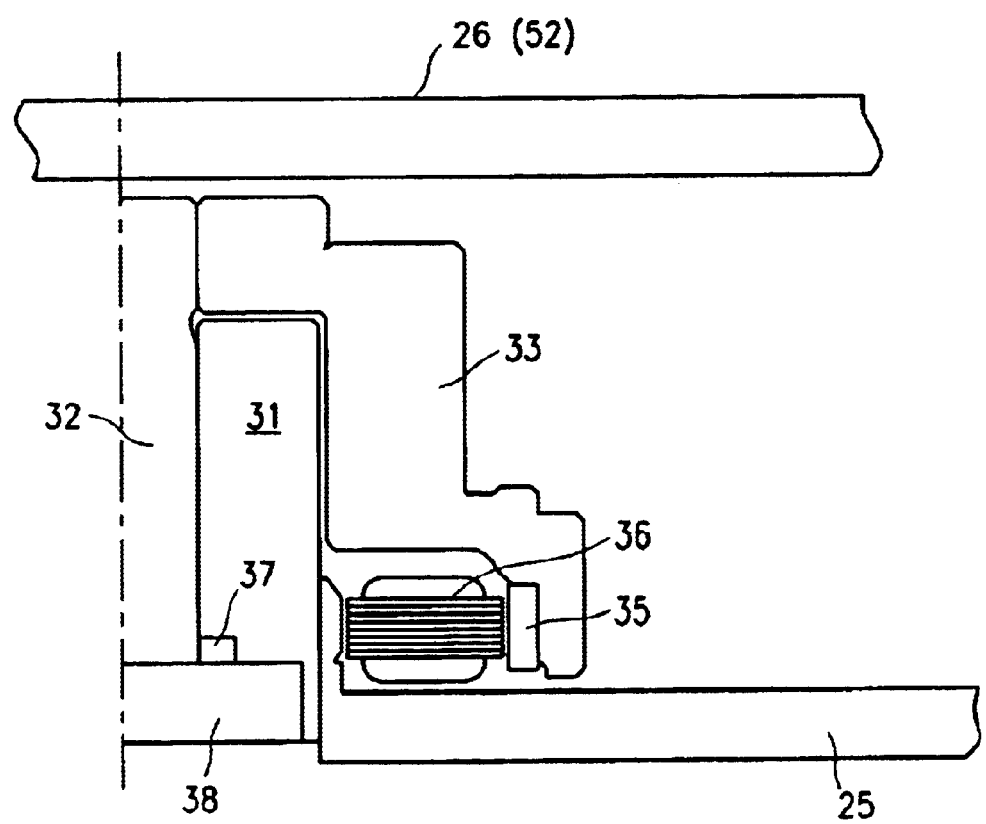
FIG. 16 shows a cross section of a half section of a motor for describing another example of a motor bearing monitoring device of the present invention.

FIGS. 16 and 17 schematically show a structure of electrode placements in a motor bearing monitoring device 40 designed to detect the rotation state of the dynamic pressure bearing section based only on resistance changes. In this case, the only electrode needed is an excitation electrode 52a (the lid 26) that applies alternating voltage to a disk hub 33. The electrode 52a is placed in close proximity to the disk hub 33 via a capacitor C2. Between the electrode 52a and an alternating voltage source 53 is a resistor R2 connected in serial. A voltage detector 54 detects voltage at both ends of the resistor R2.

Figure 17A:
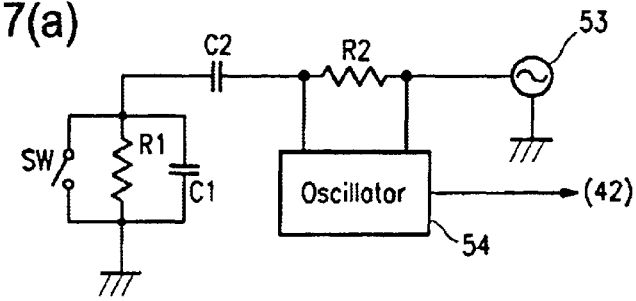
FIGS. 17(a), (b) and (c) show an equivalent circuit diagram of an impedance detection circuit of the motor bearing monitoring device shown in FIG. 16, a circuit diagram when the bearing is in a contact rotation state, and a circuit diagram when the bearing is in a non-contact rotation state, respectively.
Figure 17B:
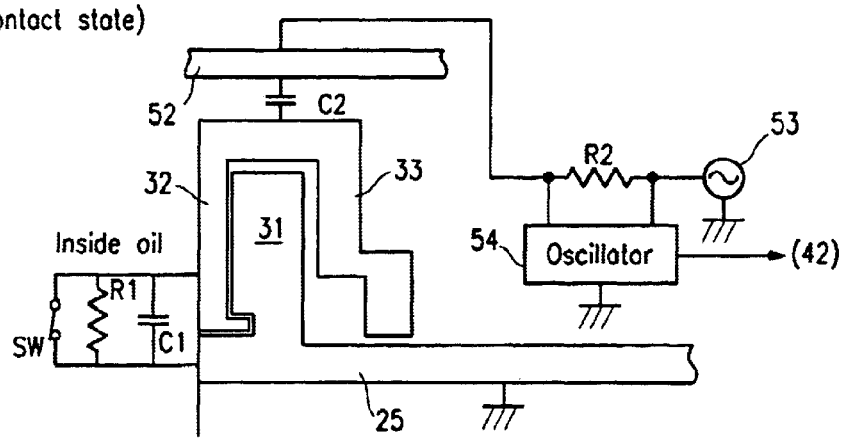
Figure 17C:
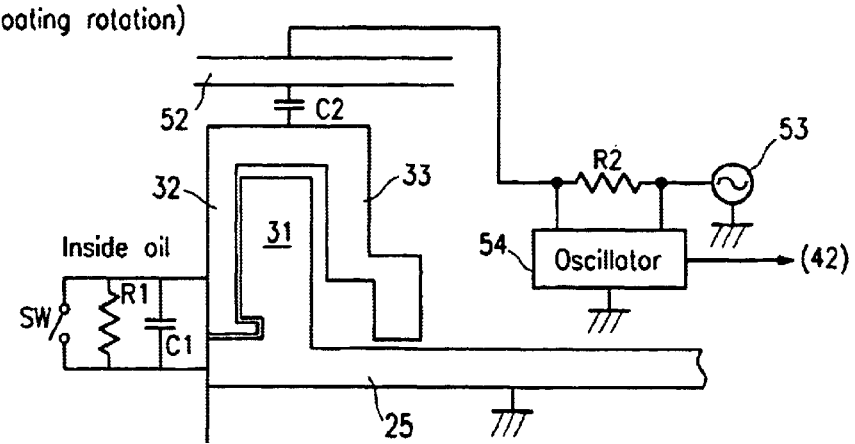

An equivalent circuit thus structured is indicated in FIG. 17(a); when a rotating shaft 32 is in a contact state, as shown in FIG. 17(b), most of the electric line force components that flowed from the electrode 52a to the disk hub 33 via the capacitor C2 flow into the ground side via a base 25; consequently, a large amount of current flows into the resistor R2, which leads to large voltage values at both ends of the resistor. In contrast, when the rotating shaft 32 is in a non-contact state, as shown in FIG. 17(c), the switch SW is off and the circuit is substantially in a shut-off state, which makes the amount of current flow into the resistor R2 small, which in turn makes the voltage detected extremely small.

When the structure is designed to detect resistance changes only as shown in FIGS. 16 and 17, there is an advantage of easier detection compared to the structure shown in FIGS. 11 through 15, and if only one electrode is used (since the electrode 51 can be eliminated in this embodiment), there is an added advantage of having a simplified circuit structure.

Furthermore, in the above description, alternating voltage was applied to the disk hub 33 side, but it may be applied to the base 25 side. When using a detection terminal to make the contact for detection instead of a non-contact type electrode, direct voltage instead of alternating voltage may be applied.

Moreover, when magnetic disks 23 are mounted on the disk hub 33, this provides the advantage of having the gap between the electrode 52 and the base 25 securely shielded by the magnetic disks.

(Variation of the Electrode Structure)

Figure 18A:
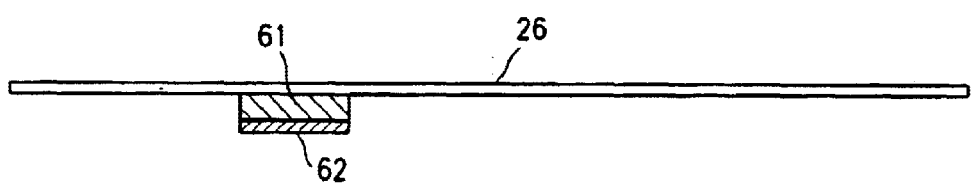
FIGS. 18(a) and (b) show two other examples of electrode disposing structures in the motor bearing monitoring device shown in FIG. 11.

In the embodiment described above, the electrode 52 and the lid 26 are the same, but a separate electrode may be attached to the lid 26. For example, as shown in FIG. 18(a), an electrode plate 62 can be affixed via an insulating adhesive layer 61 on the inner surface of the lid 26 at the part that opposes the top surface of the disk hub 33.

Figure 18B:
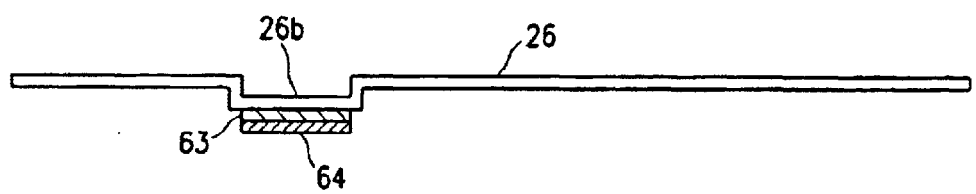

Alternatively, as shown in FIG. 18(b), the part of the lid 26 that opposes the disk hub 33 can be made to protrude towards the top surface of the disk hub and an electrode plate 64 can be affixed via an insulating adhesive layer 63 on the inner surface of the protrusion 26b.

When using the disk driving motor 22 having a structure shown in FIGS. 11 and 12, the counter plate 38 can be used as an electrode.

In this case, as indicated by a shaded area 70 in FIG. 19, the sleeve 31 and the counter plate 38 are electrically insulated from each other and an electric contact 71 of the bearing test circuit 41 is in contact with an under surface 38a of the counter plate 38. The counter plate 38 can also be used as the excitation electrode 51 and/or as the detection electrode 52 in the embodiments above.

(Another Example of the Status Detection Circuit)

The status detection circuit described above detects the status of the dynamic pressure bearing section based on impedance changes in the dynamic pressure bearing section, but the rotation state of the dynamic pressure bearing section can be detected in the following manner instead.

For example, the AE (Acoustic Emission) method generally used to measure the number of contact revolutions of dynamic pressure bearings can be used. The AE method is a method in which the acoustic energy generated by metal parts coming into contact with each other is detected by a vibration sensor and converted into voltage. The AE method is also used as a bearing diagnostic method to measure the damage condition or the life of bearings in general.

Figure 23:
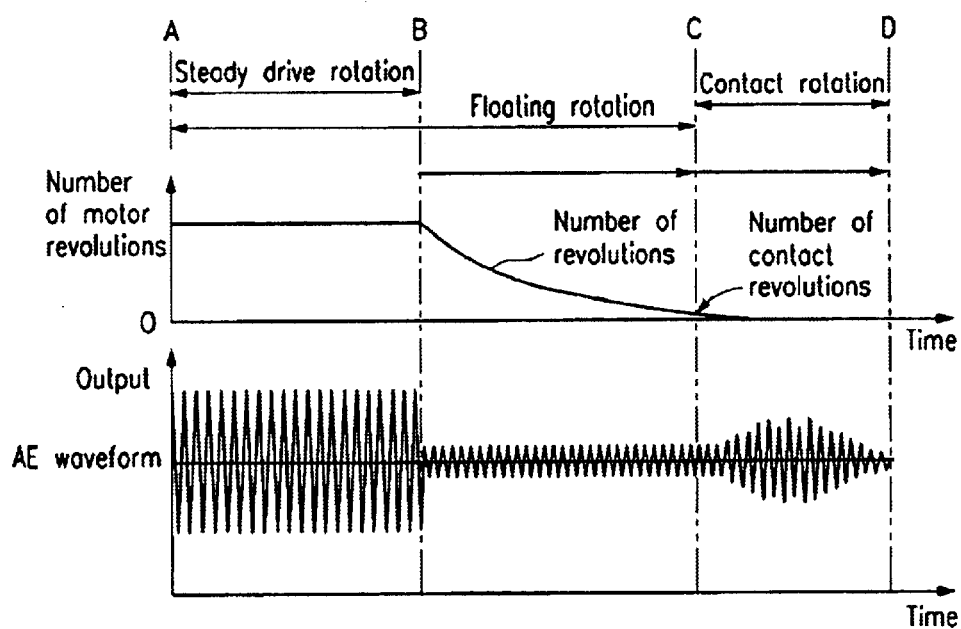
FIG. 23 shows a detected voltage waveform of a dynamic pressure bearing obtained by the conventional AE method, the number of motor revolutions.

The AE waveform that can be obtained from a motor with an oil dynamic pressure bearing, e.g., the disk driving motor 22 with a structure shown in FIGS. 11 and 12, based upon the AE method is the same as the one described under prior art and shown in FIG. 23. The AE waveform converts into voltage the strength of vibration detected by an AE sensor from a motor bearing section, and the result is observed on an oscilloscope screen.

In FIG. 23, when the motor is in a steady rotation state (the interval between points A and B in the figure), the switching noise of the motor drive current is overwhelmingly dominant, which makes it difficult to detect contact sounds from the bearing section. Accordingly, the determination of abnormality may be performed after the motor drive has stopped but before the inertial rotation stops (the interval between points B and D).

As a result, by waveform-analyzing the AE waveform, the abnormality determination circuit 42 can detect the number of contact revolutions and based on it determine whether there is an abnormal rotation state. In the steady rotation state, if noise caused by motor drive current can be eliminated, an abnormal rotation state can be determined based on the AE waveform.

Figure 20:
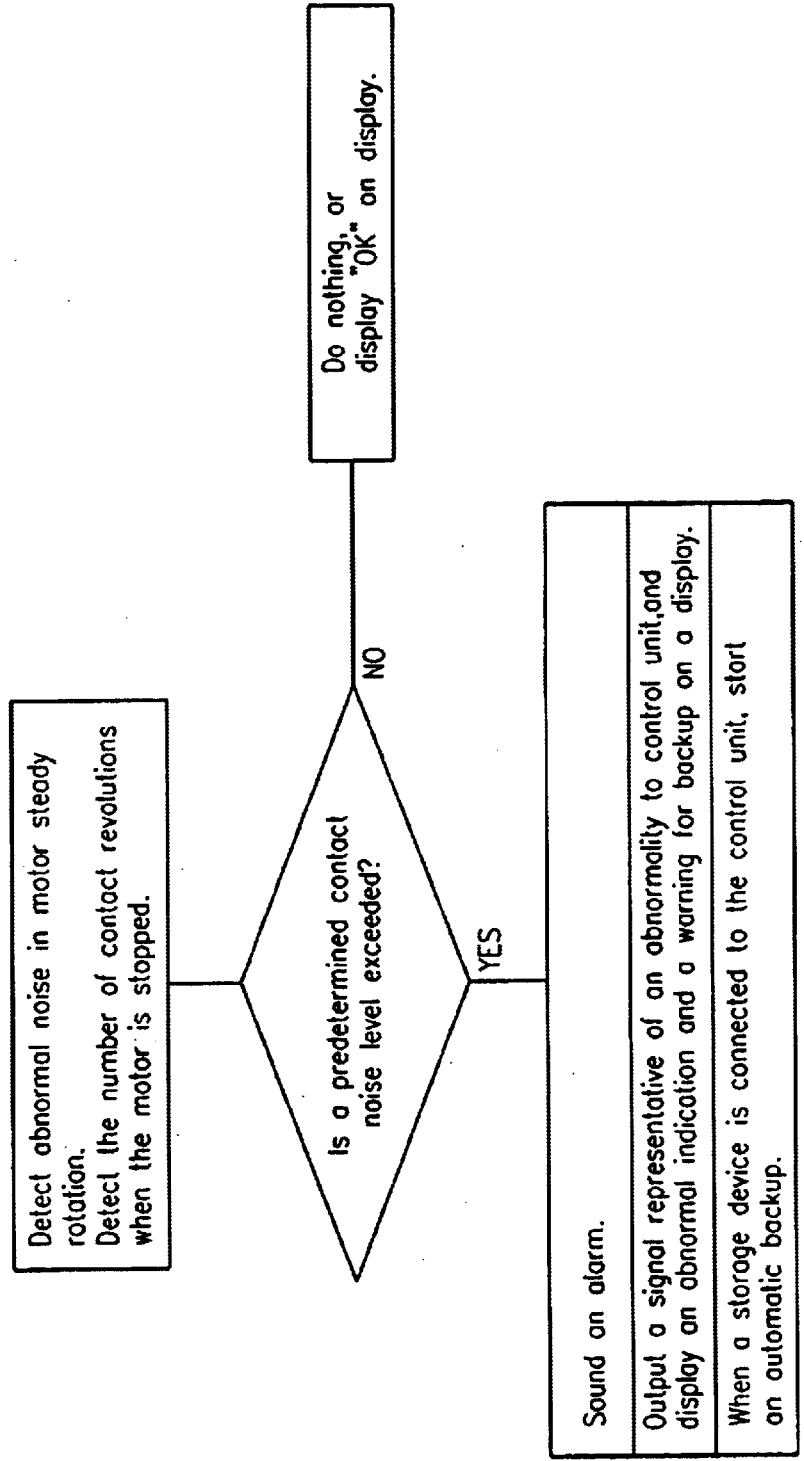
FIG. 20 schematically shows a flow chart of an operation to determine abnormality with a bearing, which is performed by the motor bearing monitoring device when the AE method is used.

Even when determinations are made based on AE waveforms, an operator can be warned of an abnormal state and recorded data on the hard disk can be backed up, based on abnormality determination operations indicated in FIG. 20.

Next, among methods to detect abnormalities in the motor bearing section is a method to detect the temperature of the bearing section and based on that determine whether there is an abnormality with the bearing. In other words, in many motors locking is caused by burns resulting from metals in the bearing section sliding against each other without lubrication. When a burn occurs, the temperature of the parts where the metals are sliding against each other becomes high; by detecting this rise in temperature, occurrences of abnormality in the bearing section can be detected.

Figure 21:
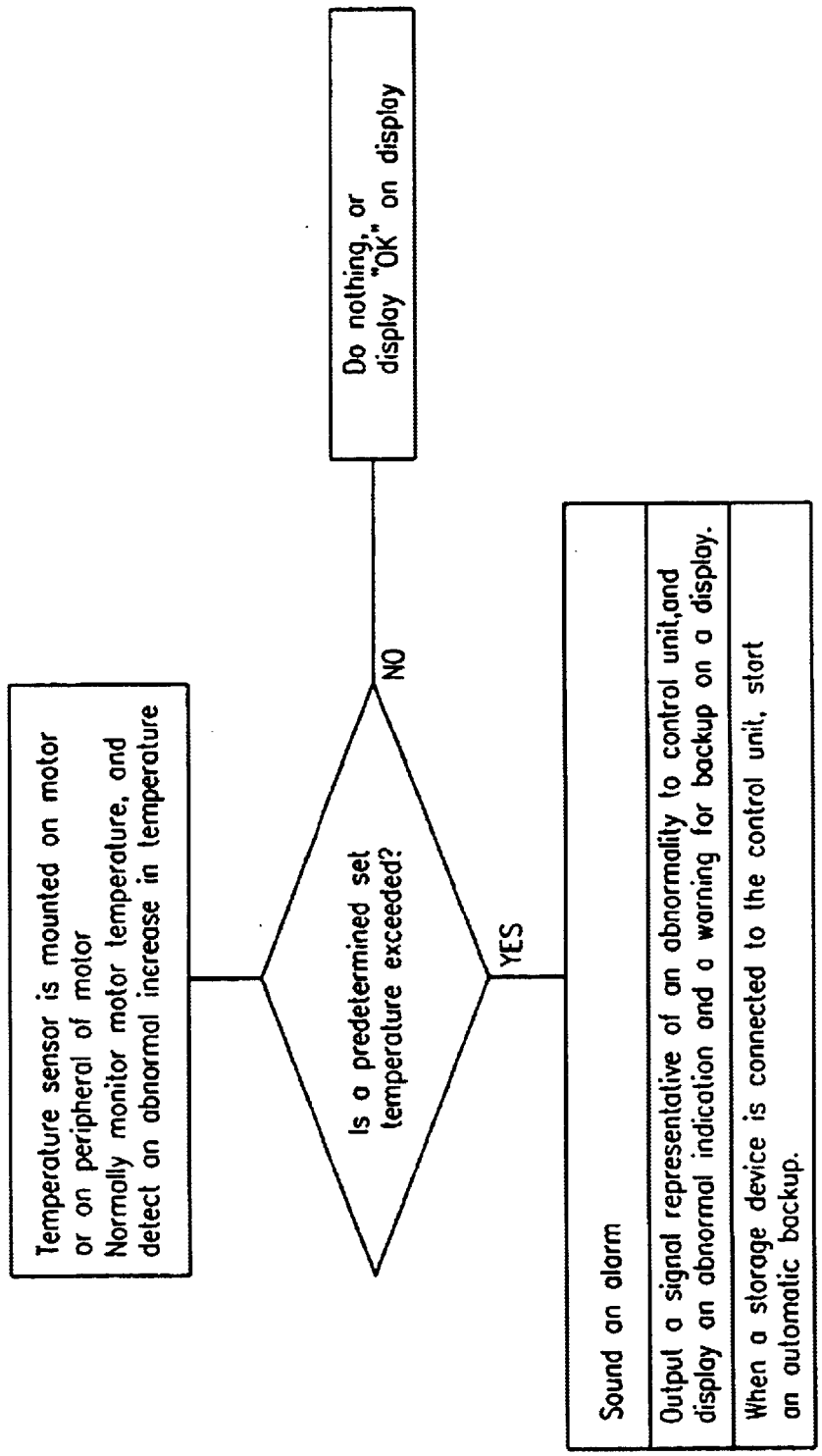
FIG. 21 schematically shows a flow chart of an operation to determine abnormality with a bearing, which is performed by the motor bearing monitoring device when a temperature sensor is used.

In the case of the disk driving motor 22 shown in FIGS. 11 and 12, for example, the status detection circuit 41 can function as a temperature sensor placed close to the rotating shaft 32 or the sleeve 31. The abnormality determination circuit 42 compares the detected temperature against the determination temperature pre-stored in memory. If the detected temperature is higher than the determination temperature, the abnormality determination circuit 42 determines that there is an abnormality with the bearing section. An example of an abnormality determination operation in this situation is shown in FIG. 21.

Next, with the hard disk drive 21, a method based on the number of retry attempts made by the magnetic head 24 can be used as an abnormality detection method for the motor bearing section. In other words, if there is an abnormality with the bearing section, the vibration on rotation becomes larger, which causes a greater number of tracking errors on the magnetic head 24 to occur. Consequently, writing on or reading from the magnetic disk 23 would fail and there would be a greater number of retry attempts to read and/or write.

Figure 22:
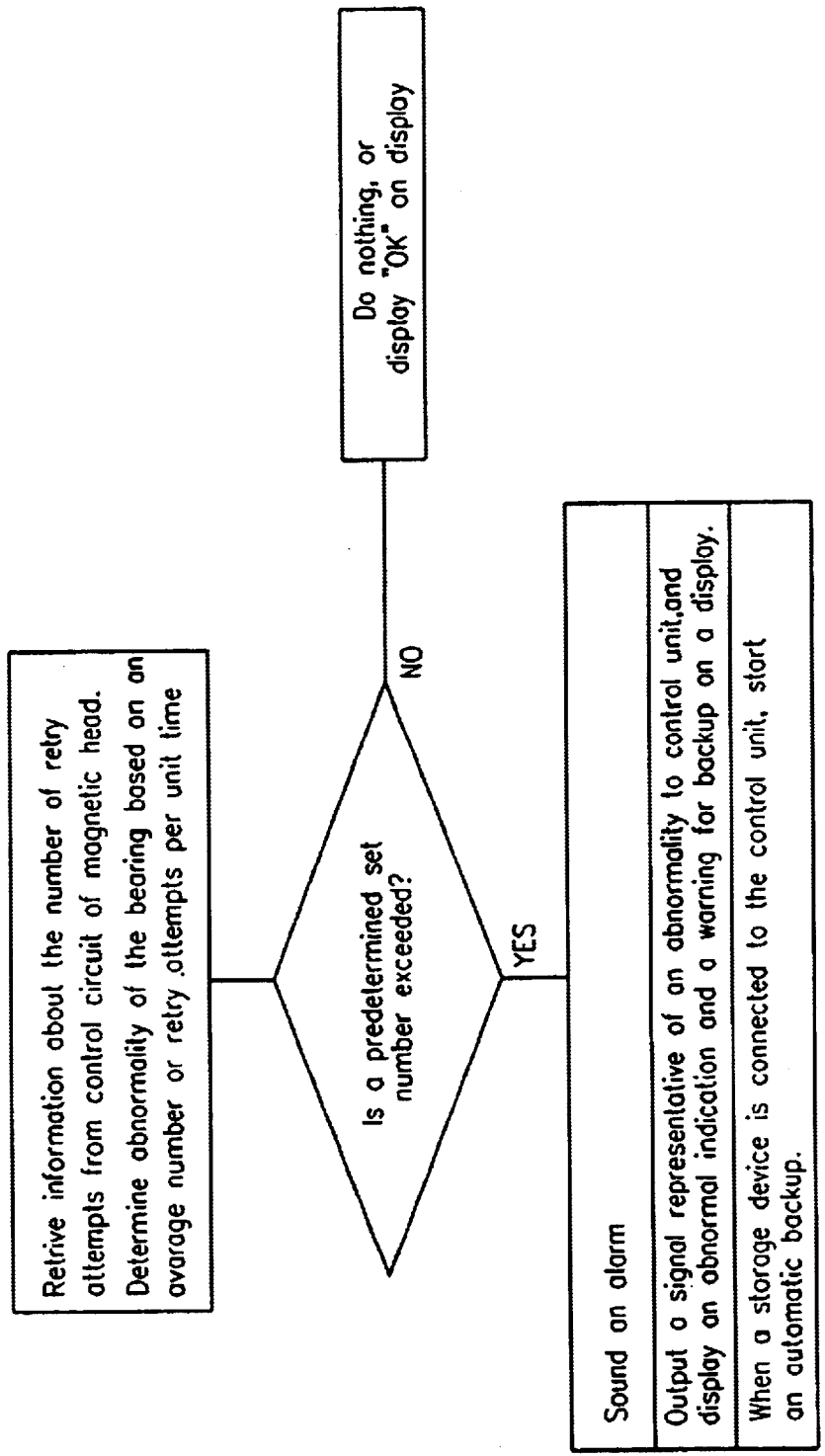
FIG. 22 schematically shows a flow chart of an operation to determining abnormality with a bearing based on the number of retry operations by the magnetic head.

As a result, the status detection circuit 41 of the motor bearing monitoring device 40 can detect the number of retry attempts made, while the abnormality determination circuit 42 can calculate the average number of retry attempts made in a given amount of time and determine that there is an abnormality with the bearing if the average number of retry attempts made exceeds the predetermined number. An example of the abnormality determination operation in this situation is indicated in FIG. 22.

(Bearings That can be Monitored)

The preceding description concerns embodiments in which the present invention is applied to the determination of abnormalities in oil dynamic pressure bearings, but dynamic pressure bearings that use high resistance fluids and gases other than oil, such as air and water, can also be the subject of testing. Furthermore, they can be bearings other than the dynamic pressure bearings. For example, it goes without saying that the present invention can be applied to monitor abnormal rotation in sliding bearings such as sintered bearings made from sintered bodies containing solid lubricating material, and roll bearings such as ball bearings in which rolling bodies are inserted.

Further, in the embodiments described above, the present invention is applied to monitor dynamic pressure bearings of motors assembled into hard disk drives, but the present invention can also be applied to monitor bearing sections in other devices as well. For example, the present invention can be applied to monitor the rotating part of an optical scanning device that scans while rotating a polygon mirror, the rotating part of a photosensitive drum of a copier, or the rotating part of an oil circulation pump.

As described above, when a shaft element and a bearing element of a bearing are in a contact rotation state and in a non-contact rotation state, the electrical characteristics between these elements such as impedance, i.e., resistance, capacitance change. In the bearing test method and bearing test apparatus of the present invention, the changes in impedance between the shaft element and the bearing element are utilized to detect the number of contact revolutions of the bearing (or the number of float revolutions), and abnormal revolution states.

Therefore, according to the present invention, tests on bearings can be accurately performed in a shorter time compared to the tests that are conducted based on acoustic energy generated by the bearing section.

Also, when the bearing section of a motor is examined, tests can be conducted without being affected by noise caused by switching of the motor drive current, and the tests can be conducted without regard to the driving state of the motor.

Furthermore, since bearings can be tested in a non-contact manner, there are other advantages when bearings for hard disk driving motors are tested. Namely, contamination by dust adhesion or the like, which might be caused by an electrode on the test apparatus being brought in contact with parts on the motor side, can be prevented.

Also, a motor bearing monitoring apparatus of the present invention is structured to monitor states of the motor bearing section, determines whether there is an abnormality with the motor bearing section, and outputs a warning against such abnormality when an abnormality occurs. Accordingly, in accordance with the present invention, the generation of fatale problems such as locking of the motor and the like can be predicted, and such problems can be prevented beforehand.

Also, by a memory device of the present invention, when an abnormality in the motor bearing section is detected, a warning of such abnormality is outputted, and a message that urges for backing up the stored contents in the memory device can be outputted. As a result, fatale problems such as the occurrence of motor locking that causes stored data unretrievable can be prevented. Furthermore, when an abnormality occurs, stored data can be automatically backed up by a backup auxiliary memory medium. This provides a very secure and convenient backup system.

Furthermore, in accordance with the present invention, the property in which abnormal revolution states of a dynamic pressure bearing change the electrical characteristics such as impedance, i.e., resistance, capacitance and the like of the bearing is utilized. As a result, the changes in impedance between the bearing elements are utilized to detect the number of contact revolutions of the bearing (or the number of float revolutions), and abnormal revolution states. Accordingly, abnormalities of bearings can be accurately detected.

Also, in judging abnormality of a bearing based on changes in impedance, the status of the bearing can be detected in a non-contact manner. Accordingly, when a motor bearing for a hard disk drive or the like is monitored, contamination by dust adhesion or the like, which might be caused by an electrode on the monitoring apparatus being brought in contact with parts on the motor side, can be prevented.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A bearing test method to test, in a bearing that can retain a shaft element and a bearing element coaxially positioned in a non-contact state when the number of revolutions exceeds a predetermined number of relative revolutions, whether the shaft element and the bearing element are in a contact rotation state, the method comprising the steps of:

relatively rotating the shaft element and the bearing element;

detecting a change in impedance between the shaft element and the bearing element in the relative rotation state, determining, based on the change in impedance, whether the shaft element and the bearing element are in a contact rotation state, by identifying a small waveform part of the waveform of the impedance through identifying an irregular part that appears in a waveform-converted waveform so that the amplitude size is reversed.

2. A bearing test method according to claim 1, wherein:

a resistance change or a capacitance change, or both is detected in a state when the shaft element and the bearing element are relatively rotating.

3. A bearing test method according to claim 1, wherein the impedance change is detected while the number of relative revolutions between the shaft element and the bearing element is varied, and based on a detected impedance change, the number of relative revolutions is detected when the shaft element and the bearing element switch from a contact rotation state to a non-contact rotation state, or from a non-contact rotation state to a contact rotation state.

4. A bearing test method to test, in a bearing that can retain a shaft element and a bearing element coaxially positioned in a non-contact state when the number of revolutions exceeds a predetermined number of relative revolutions, whether the shaft element and the bearing element are in a contact rotation state, the method comprising the steps of: relatively rotating the shaft element and the bearing element, detecting a change in impedance between the shaft element and the bearing element in the relative rotation state, determining, based on the change in impedance, whether the shaft element and the bearing element are in a contact rotation state; wherein: the impedance change is detected while the number of relative revolutions between the shaft element and the bearing element is varied; based on a detected impedance change, the number of relative revolutions is detected when the shaft element and the bearing element switch from a contact rotation state to a non-contact rotation state, or from a non-contact rotation state to a contact rotation state; the number of relative revolutions is increased from zero, and the number of relative revolutions is detected as the number of floating rotation when the shaft element and the bearing element switch from a contact rotation state to a non-contact rotation state.

5. A bearing test method according to claim 3, wherein the number of relative revolutions is decreased, and the number of relative revolutions is detected as the number of contact rotation when the shaft element and the bearing element switch from a non-contact rotation state to a contact rotation state.

6. A bearing test method according to claim 1, wherein whether the shaft element and the bearing element are in an abnormal contact rotation state is determined based on the impedance change.

7. A bearing test method to test, in a bearing that can retain a shaft element and a bearing element coaxially positioned in a non-contact state when the number of revolutions exceeds a predetermined number of relative revolutions, whether the shaft element and the bearing element are in a contact rotation state, the method comprising the steps of: relatively rotating the shaft element and the bearing element; detecting a change in impedance between the shaft element and the bearing element in the relative rotation state, determining, based on the change in impedance, whether the shaft element and the bearing element are in a contact rotation state; whether the shaft element and the bearing element are in an abnormal contact rotation state is determined based on the impedance change; and a determination is made that the abnormal contact rotation state is caused by a foreign matter that is contaminated in the gap between the shaft element and the bearing element when the number of relative revolutions is constant and when the impedance change occurs in an irregular manner.

8. A bearing test method according to claim 6, wherein, when the number of relative revolutions is constant and impedance changes occur cyclically, a determination is made that the abnormal contact rotation state is caused either by the shaft element or the bearing element itself or by a foreign matter rotating synchronously with the shaft element or the bearing element.

9. A bearing test method according to claim 1, wherein the impedance change is detected in a non-contact manner with respect to the shaft element or the bearing element.

10. A bearing test method according to claim 1, wherein the bearing is a dynamic pressure bearing that includes grooves for generating a dynamic pressure by a fluid between the shaft element and the bearing element.

11. A bearing test method according to claim 1, wherein the bearing is a bearing for a revolving-armature in which a rotor of the revolving-armature is rotatably supported with respect to a stator.

12. A motor bearing monitoring device comprising: a status detection device that detects the state of a motor bearing; an abnormality determination device that makes a determination whether the bearing is in an abnormal state based on the state of the bearing as detected by the status detection device; and an output device that outputs a result of the determination from the abnormality determination device; wherein the bearing forms a non-contact rotation state via a fluid film when the number of revolutions exceeds predetermined number of revolutions, the status detection device is an impedance detection device that detects impedance of the bearing, and the abnormality determination device, based on a change in impedance, determines a point at which the bearing switches from a contact rotation state to a non-contact rotation state when the motor starts, and determines that there is an abnormality with the bearing when the number of motor revolutions at that point exceeds a predetermined number of float revolutions.

13. A motor bearing monitoring device comprising: a status detection device that detects the state of a motor bearing; an abnormality determination device that makes a determination whether the bearing is in an abnormal state based on the state of the bearing as detected by the status detection device; and an output device that outputs a result of the determination from the abnormality determination device; wherein the bearing forms a non-contact rotation state via a fluid film when the number of revolutions exceeds predetermined number of revolutions, the status detection device is an impedance detection device that detects impedance of the bearing, and the abnormality determination device, based on a change in impedance, determines whether the bearing is in a contact rotation state when the motor is in a steady rotation state, and determines that there is an abnormality with the bearing when the bearing is in a contact rotation state or when a momentary contact rotation state occurs repeatedly.

14. A motor bearing monitoring device comprising: a status detection device that detects the state of a motor bearing; an abnormality determination device that makes a determination whether the bearing is in an abnormal state based on the state of the bearing as detected by the status detection device; and an output device that outputs a result of the determination from the abnormality determination device; wherein the bearing forms a non-contact rotation state via a fluid film when the number of revolutions exceeds a predetermined number of revolutions, the status detection device is an impedance detection device that detects impedance of the bearing, and the abnormality determination device, based on a change in impedance, determines a point at which the bearing switches from a non-contact rotation state to a contact rotation state when the motor is stopping, and determines that there is an abnormality with the bearing when the number of motor revolutions at that point exceeds a predetermined number of contact revolutions.

15. A motor bearing monitoring device comprising: a status detection device that detects the state of a motor bearing; an abnormality determination device that makes a determination whether the bearing is in an abnormal state based on the state of the bearing as detected by the status detection device; and an output device that outputs a result of the determination from the abnormality determination device; wherein the status detection device is an impedance detection device that detects impedance of the bearing, the impedance detection device comprises a voltage application device that applies alternating voltage to one of a first bearing element and a second bearing element that rotate relatively in a contact rotation state or non-contact rotation state, and an output voltage detection device that detects output voltage from the other, and wherein the abnormality determination device, based on a change in the output voltage, determines whether the first and second bearing elements are in a contact rotation state.

16. A motor bearing monitoring device according to claim 15, wherein the voltage application device is an alternating voltage a plication device that applies alternating voltage.

17. A motor bearing monitoring device according to claim 16, wherein the alternating voltage application device comprises an excitation electrode placed in close proximity to one of the first bearing element and the second bearing element and an alternating voltage source that applies alternating voltage to the excitation electrode, and wherein the output voltage detection device comprises a detection electrode placed in close proximity to the other of the bearing elements, and an output voltage detector that detects output voltage provided as output by the detection electrode.

18. A motor bearing monitoring device according to claim 17, wherein each of the excitation electrode and the detection electrode is a ring type or a cylinder type.

19. A motor bearing monitoring device according to claim 17, wherein the impedance detection circuit is a LC resonant circuit with an inductor serially connected between the detection electrode and the ground.

20. A motor bearing monitoring device according to claim 19, wherein the frequency of the alternating voltage to be applied is a LC resonant frequency.

21. A motor bearing monitoring device according to claim 20, wherein the LC resonant frequency is obtained by monitoring in advance output voltage waveform observed in contact and non-contact states, and adjusting a frequency such that the output voltage waveform has the maximum amplitude.

22. A motor bearing monitoring device according to claim 15, wherein the abnormality determination device comprises a wave form conversion circuit that converts an output voltage waveform that is detected by the output voltage detection device.

23. A motor bearing monitoring device according to claim 15, wherein the bearing is a dynamic pressure bearing in which a rotor of a hard disk driving motor is rotatably supported with respect to a stator of the hard disk driving motor.

24. A motor bearing monitoring device according to claim 23, wherein the hard disk driving motor comprises a base plate, and a disk hub for mounting a hard disk thereon, wherein a sleeve as one of the first and second bearing elements is formed in the base plate, and a rotor shaft as the other of the bearing elements is provided in the center of the disk hub.

25. A motor bearing monitoring device according to claim 24, wherein the voltage application device comprises an excitation electrode placed in close proximity to one of the shaft element and the bearing element and an alternating voltage source that applies alternating voltage to the excitation electrode, and the hard disk driving motor comprises a motor case that is disposed in close proximity to the base plate or the disk hub, and the motor case is used as the excitation electrode or the detection electrode.

26. A motor bearing monitoring device according to claim 25, wherein the base plate is provided with a counter plate as a bearing element that forms a dynamic pressure thrust bearing between the rotor shaft and the base plate, wherein the counter plate is electrically insulated from the base plate and used as the excitation electrode or the detection electrode.

27. A motor bearing monitoring device according to claim 23, wherein the hard disk driving motor comprises a base plate, and a disk hub for mounting a hard disk thereon, wherein a shaft as one of the first and second bearing elements is affixed to the base plate, and a sleeve as the other of the bearing elements is formed in the center of the disk hub.

28. A motor bearing monitoring device according to claim 27, wherein the voltage application device comprises an excitation electrode placed in close proximity to one of the shaft element and the bearing element and an alternating voltage source that applies alternating voltage to the excitation electrode, and the hard disk driving motor comprises a motor case that is disposed in close proximity to the base plate or the disk hub, and the motor case is used as the excitation electrode or the detection electrode.

29. A motor bearing monitoring device according to claim 27, wherein the alternating voltage application device comprises an excitation electrode placed in close proximity to one of the first and second bearing elements and an alternating voltage source that applies alternating voltage to the excitation electrode, and the output voltage detection device is a voltage detector that detects voltages at both ends of a resistance serially connected between the excitation electrode and the alternating voltage source.

30. A motor bearing monitoring device comprising: a status detection device that detects the state of a motor bearing; an abnormality determination device that makes a determination whether the bearing is in an abnormal state based on the state of the bearing as detected by the status detection device; and an output device that outputs a result of the determination from the abnormality determination device, wherein the bearing forms a non-contact rotation state via a fluid film when the number of revolutions exceeds predetermined number of revolutions, the status detection device is an acoustic sensor that detects acoustics generated by the bearing, and the abnormality determination device, based on an output from the acoustic sensor, determines whether the bearing is in a contact rotation state when the motor is in a steady rotation state, and determines that there is an abnormality with the bearing when the bearing is in a contact rotation state or when a momentary contact rotation state occurs repeatedly.

31. A motor bearing monitoring device comprising: a status detection device that detects the state of a motor bearing; an abnormality determination device that makes a determination whether the bearing is in an abnormal state based on the state of the bearing as detected by the status detection device; and an output device that outputs a result of the determination from the abnormality determination device, wherein the bearing forms a non-contact rotation state via a fluid film when the number of revolutions exceeds predetermined number of revolutions, the status detection device is an acoustic sensor that detects acoustics generated by the bearing, and the abnormality determination device, based on an output from the acoustic sensor, determines a point at which the bearing switches from a non-contact rotation state to a contact rotation state when the motor is stopped when the motor is in a steady rotation state, and determines that there is an abnormality with the bearing when the number of motor revolutions at that point exceeds a predetermined number of contact revolutions.

32. A memory device having a disk-shaped memory media, a disk driving motor that rotationally drives the memory media, and a head device that performs at least one of two operations that are recording information on or retrieving information from the memory media, the memory device comprising: a status detection device that detects the status of a bearing of the disk driving motor; an abnormality determination device that makes a determination as to whether the bearing is in an abnormal state based on the state of the bearing as detected by the status detection device; an output device that outputs a result of the determination from the abnormality determination device; and an auxiliary recording medium for backup purposes and onto which contents recorded on the recording media is writable when there is an abnormality with the bearing.

33. A memory device according to claim 32, further comprising a backup device that writes contents recorded on the memory medium onto the auxiliary recording medium when the abnormality determination device determines that there is an abnormality with the bearing.

34. A memory device having a disk-shaped memory media, a disk driving motor that rotationally drives the memory media, and a head device that performs at least one of two operations that are recording information on or retrieving information from the memory media, the memory device comprising: a status detection device that detects the status of a bearing of the disk driving motor; an abnormality determination device that makes a determination as to whether the bearing is in an abnormal state based on the state of the bearing as detected by the status detection device; an output device that outputs a result of the determination from the abnormality determination device; and a motor stopping device that forcefully stops the rotation of the motor when the abnormality determination device determines that there is an abnormality with the bearing.

35. A memory device having a disk-shaped memory media, a disk driving motor that rotationally drives the memory media, and a head device that performs at least one of two operations that are recording information on or retrieving information from the memory media, the memory device comprising: a status detection device that detects the status of a bearing of the disk driving motor; an abnormality determination device that makes a determination as to whether the bearing is in an abnormal state based on the state of the bearing as detected by the status detection device; and an output device that outputs a result of the determination from the abnormality determination device; wherein the status detection device is an impedance detection device that detects impedance of the bearing; and wherein the bearing forms a non-contact rotation state via a fluid film when the number of revolutions exceeds a predetermined number of revolutions, and the abnormality determination device, based on a change in impedance, determines a point at which the bearing switches from a contact rotation state to a non-contact rotation state when the motor starts, and determines that there is an abnormality with the bearing when the number of motor revolutions at that point exceeds a predetermined number of float revolutions.

36. A memory device according to claim 35, wherein the bearing wherein the bearing forms a non-contact rotation state via a fluid film when the number of revolutions exceeds a predetermined number of revolutions, and the abnormality determination device, based on a change in impedance, determines whether the bearing is in a contact rotation state when the motor is in a steady rotation state, and determines that there is an abnormality with the bearing when the bearing is in a contact rotation state or when a momentary contact rotation state occurs repeatedly.

37. A memory device according to claim 36, wherein the status detection and the abnormal judgment for the bearing are conducted at predetermined time intervals.

38. A memory device according to claim 36, wherein the status detection and the abnormal judgment for the bearing are conducted when the head device does not perform a recording operation or a reproducing operation with the memory medium.

39. A memory device according to claim 35, wherein the bearing forms a non-contact rotation state via a fluid film when the number of revolutions exceeds a predetermined number of revolutions, wherein the abnormality determination device, based on a change in the impedance, determines a point at which the bearing switches from a non-contact rotation state to a contact rotation state when the motor is stopped, and determines that there is an abnormality with the bearing when the number of motor revolutions at that point exceeds a predetermined number of contact revolutions.

40. A memory device having a disk-shaped memory media, a disk driving motor that rotationally drives the memory media, and a head device that performs at least one of two operations that are recording information on or retrieving information from the memory media, the memory device comprising: a status detection device that detects the status of a bearing of the disk driving motor; an abnormality determination device that makes a determination as to whether the bearing is in an abnormal state based on the state of the bearing as detected by the status detection device; an output device that output s a result of the determination from the abnormality determination device; wherein the status detection device is an acoustic sensor that detects acoustics generated by the bearing.

41. A memory device according to claim 40, wherein the bearing forms a non-contact rotation state via a fluid film when the number of revolutions exceeds a predetermined number of revolutions, wherein the abnormality determination device, based on an output from the acoustic sensor, determines whether the bearing is in a contact rotation state when the motor is in a steady rotation state, and determines that there is an abnormality with the bearing when the bearing is in a contact rotation state or when a momentary contact rotation state occurs repeatedly.

42. A memory device according to claim 41, wherein the status detection and the abnormal judgment for the bearing when the motor is in a steady rotation state are conducted at predetermined time intervals.

43. A memory device according to claim 41, wherein the status detection and the abnormal judgment for the bearing when the motor is in a steady rotation state are conducted when the head device does not perform a recording operation or a reproducing operation with the memory medium.

44. A memory device according to claim 40, wherein the bearing forms a non-contact rotation state via a fluid film when the number of revolutions exceeds a predetermined number of revolutions, wherein the abnormality determination device, based on an output from the acoustic sensor, determines a point at which the bearing switches from a non-contact rotation state to a contact rotation state when the motor is stopping, and determines that there is an abnormality with the bearing when the number of motor revolutions at that point exceeds a predetermined number of contact revolutions.

45. A memory device having a disk shaped memory media, a disk driving motor that rotationally drives the memory media, and a head device that performs at least one of two operations that are recording information on or retrieving information from the memory media, the memory device comprising: a status detection device that detects the status of a bearing of the disk driving motor; an abnormality determination device that makes a determination as to whether the bearing is in an abnormal state based on the state of the bearing as detected by the status detection device; an output device that outputs a result of the determination from the abnormality determination device; wherein the status detection device is a temperature sensor that detects temperatures of the bearing.

46. A memory device having a disk-shaped memory media, a disk driving motor that rotationally drives the memory media, and a head device that performs at least one of two operations that are recording information on or retrieving information from the memory media, the memory device comprising: a status detection device that detects the status of a bearing of the disk driving motor; an abnormality determination device that makes a determination as to whether the bearing is in an abnormal state based on the state of the bearing as detected by the status detection device; an output device that outputs a result of the determination from the abnormality determination device; wherein the status detection device is a retry number detection device that detects the number of retry attempts made by the head device to record on or retrieve from the recording media, the abnormality determination device calculates an average number of retry attempts made in a given amount of time based upon the number of detected retry attempts made, and determines that there is an abnormality with the bearing if the average number of retry attempts made exceeds a predetermined number.

47. A memory device according to claim 46, wherein the output device is a display device or a speaker.

48. A memory device according to claim 35, wherein the impedance detection device comprises a voltage application device that applies alternating voltage to one of a first bearing element and a second bearing element that rotate relatively in a contact rotation state or non-contact rotation state and an output voltage detection device that detects output voltage from the other, and wherein the abnormality determination device, based on a change in the output voltage, determines whether the first and second shaft bearing are in a contact rotation state.

49. A memory device according to claim 48, wherein the alternating voltage application device comprises an excitation electrode placed in close proximity to one of the first bearing element and the second bearing element and an alternating voltage source that applies alternating voltage to the excitation electrode, and the output voltage detection device comprises a detection electrode placed in close proximity to the other of the bearing elements, and an output voltage detector that detects output voltage provided as output by the detection electrode.

50. A memory device according to claim 49, wheren the impedance detection circuit is a LC resonant circuit with an inductor serially connected between the detection electrode and the ground.

51. A memory device according to claim 48, wherein the alternating voltage application device comprises an excitation electrode placed in close proximity to one of the first and second bearing elements and an alternating voltage source that applies alternating voltage to the excitation electrode, and the output voltage detection device is a voltage detector that detects voltages at both ends of a resistance serially connected between the excitation electrode and the alternating voltage source.

52. A memory device according to claim 48, wherein the abnormality determination device comprises a waveform conversion circuit that converts an output voltage waveform that is detected by the output voltage detection device.

53. A memory device according to claim 48, wherein the bearing is a dynamic pressure bearing.

54. A memory device according to claim 51, wherein the disk driving motor comprises a base plate, and a disk hub for mounting the memory medium thereon, wherein a sleeve as one of the first and second bearing elements is formed on the base plate, and a rotor shaft as the other of the bearing elements is formed in the center of the disk hub.

55. A memory device according to claim 52, wherein the voltage application device comprises an excitation electrode placed in close proximity to one of the shaft element and the bearing element and an alternating voltage source that applies alternating voltage to the excitation electrode, and the disk driving motor comprises a motor case that is disposed in close proximity to the base plate or the disk hub, and the motor case is used as the excitation electrode or the detection electrode.

56. A memory device according to claim 52, wherein the voltage application device comprises an excitation electrode placed in close proximity to one of the shaft element and the bearing element and an alternating voltage source that applies alternating voltage to the excitation electrode, and the base plate is provided with a counter plate as the bearing element that forms a dynamic pressure thrust bearing between end faces of the rotor shaft and the base plate, wherein the counter plate is electrically insulated from the base plate and used as the excitation electrode or the detection electrode.

* * * * *